(12) United States Patent
Akita et al.

(10) Patent No.: US 7,389,766 B2
(45) Date of Patent: Jun. 24, 2008

(54) FUEL SUPPLY APPARATUS FOR INTERNAL COMBUSTION ENGINE

(75) Inventors: Tatsuhiko Akita, Toyota (JP); Naoki Kurata, Nishikamo-gun (JP); Daichi Yamazaki, Toyota (JP); Mitsuto Sakai, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/826,946

(22) Filed: Jul. 19, 2007

(65) Prior Publication Data

US 2007/0261674 A1    Nov. 15, 2007

Related U.S. Application Data

(62) Division of application No. 11/218,648, filed on Sep. 6, 2005, now Pat. No. 7,263,973.

(30) Foreign Application Priority Data

Oct. 7, 2004 (JP) ............................. 2004-295220
Dec. 13, 2004 (JP) ............................. 2004-360046

(51) Int. Cl.
*F02B 7/02* (2006.01)
(52) U.S. Cl. ........................................ 123/431; 123/457
(58) Field of Classification Search ................. 123/431, 123/446, 456, 457, 458, 459, 464, 463, 299, 123/495, 497; 73/119 A
See application file for complete search history.

(56) References Cited

U.S. PATENT DOCUMENTS

| 5,924,405 | A | 7/1999 | Hashimoto |
| 6,131,548 | A | 10/2000 | Yano |
| 6,186,112 | B1 | 2/2001 | Takahashi et al. |
| 7,055,503 | B2 | 6/2006 | Shibagaki |
| 2005/0066939 | A1* | 3/2005 | Shimada et al. ............. 123/431 |
| 2006/0090733 | A1* | 5/2006 | Fujii ......................... 123/446 |

FOREIGN PATENT DOCUMENTS

| EP | 1 024 274 A2 | 8/2000 |
| JP | A 64-035073 | 2/1989 |
| JP | A 07-103048 | 4/1995 |
| JP | A 09-021369 | 1/1997 |
| JP | A 10-274076 | 10/1998 |
| JP | A 11-351041 | 12/1999 |
| JP | A 2001-027164 | 1/2001 |
| JP | A 2002-364409 | 12/2002 |
| JP | A 2003-278624 | 10/2003 |

* cited by examiner

*Primary Examiner*—Mahmoud Gimie
(74) *Attorney, Agent, or Firm*—Oliff & Berridge, PLC

(57) ABSTRACT

The engine ECU executes a program including the step of detecting an engine coolant temperature, the step of detecting an engine speed and an engine load, the step of estimating a temperature at a tip end of an in-cylinder injector based on the engine coolant temperature, the engine speed and the engine load, and, when the temperature at the tip end is greater than a guaranteed temperature, the step of calculating a drive duty of a high-pressure fuel pump that ensures a decrease of the temperature at the tip end of the in-cylinder injector to the guaranteed temperature, and the step of controlling the high-pressure fuel pump using the drive duty.

20 Claims, 10 Drawing Sheets

FUEL SUPPLY APPARATUS FOR INTERNAL COMBUSTION ENGINE

This is a Divisional of application Ser. No. 11/218,648 filed Sep. 6, 2005 now U.S. Pat. No. 7,263,973. The disclosure of the prior application is hereby incorporated by reference herein in its entirety.

BACKGROUND OF THE INVENTION

1. Field of the Invention

The present invention relates to a fuel supply apparatus for an internal combustion engine having only an in-cylinder injector for injecting fuel into a cylinder, or an internal combustion engine having the in-cylinder injector and an intake manifold injector for injecting fuel into an intake manifold or an intake port. More particularly, the present invention relates to a technique for suppressing formation of deposits in the injection hole of the in-cylinder injector.

2. Description of the Background Art

A fuel injection apparatus for an internal combustion engine provided with an in-cylinder injector and an intake manifold injector and controlling a fuel injection ratio between the two injectors is described, e.g., in Japanese Patent Laying-Open No. 07-103048.

In the apparatus described in Japanese Patent Laying-Open No. 07-103048, the in-cylinder injectors corresponding to the respective cylinders are connected to a common fuel delivery pipe. The fuel delivery pipe is connected to a high-pressure fuel pump driven by the internal combustion engine, via a check valve allowing flow toward the fuel delivery pipe. The high-pressure fuel pipe is provided with an electromagnetic valve, and the opening/closing timings of the electromagnetic valve are controlled to adjust the quantity of the fuel discharged from the high-pressure fuel pump.

In this conventional apparatus, during the high load operation where the degree of press down of the accelerator pedal that is the load of the internal combustion engine is greater than a prescribed reference value, the fuel is injected from only the intake manifold injector toward the intake port in an early stage of the intake stroke. During this high load operation, the electromagnetic valve remains fully open, so as to stop the fuel supply from the high-pressure fuel pump to the fuel delivery pipe.

There is also known an internal combustion engine provided with an intake manifold injector for injecting fuel into an intake manifold and an in-cylinder injector for constantly injecting fuel into a combustion chamber, wherein fuel injection from the intake manifold injector is stopped when the engine load is lower than a preset load and the fuel is injected from the intake manifold injector when the engine load is greater than the preset load. In this internal combustion engine, the total injection quantity corresponding to the sum of the fuel injected from the both injectors is predetermined as a function of the load of the internal combustion engine, and the total injection quantity is increased as the load of the internal combustion engine is greater.

The in-cylinder injector is mounted such that its injection hole is directly open to the combustion chamber of the internal combustion engine. It injects the fuel having been pressurized by a fuel pump directly into the cylinder. The in-cylinder injector directly injecting the fuel into the cylinder of the internal combustion engine is configured to inject the fuel in the later stage of the compression stroke for high-precision control of the mixed state of the air-fuel mixture within the cylinder, so as to improve fuel efficiency and the like. In the in-cylinder injector thus injecting the fuel directly into the cylinder, the fuel pressure is high, which causes noise and vibration in the high-pressure fuel system. Particularly, during the low load operation (e.g., idling), the internal combustion engine makes only a small noise, making the noise and vibration from the high-pressure fuel system noticeable.

Further, since the in-cylinder injector is placed such that its tip end (where the injection hole for injecting the fuel is provided) protrudes into the combustion chamber, deposits are likely to accumulate in the injection hole, which may cause improper fuel injection. More specifically, the injection hole at the tip end of the in-cylinder injector is located in the combustion chamber, and deposits may accumulate in the injection hole in the high-temperature atmosphere, hindering injection of the fuel in a desired quantity. The temperature at the tip end of the in-cylinder injector is greatly affected by the heat received from the combustion gas. It also suffers heat received from the cylinder head, heat dissipated to the fuel, and others. It is considered that the deposits will gradually narrow the injection hole as the temperature increases.

Japanese Patent Laying-Open No. 09-021369 discloses a fuel injection control apparatus for an internal combustion engine having such a high-pressure fuel supply system, aiming at stabilization of combustion in the low load operation. The fuel injection control apparatus for the internal combustion engine includes fuel pressurizing means for pressurizing fuel, fuel injection means for injecting the fuel pressurized by the fuel pressurizing means in a controlled manner by way of opening/closing of a valve, external load detecting means for detecting a load externally applied to the engine, and pressure modifying means for decreasing the pressure of the fuel pressurizing means when the load detected by the external load detecting means is lower than a prescribed value.

According to the fuel injection control apparatus for an internal combustion engine, the external load detecting means detects the load currently applied to the engine from the outside, and the detected value is output to the pressure modifying means. The pressure modifying means, based on the value detected by the external load detecting means, sets the pressure applied by the fuel pressurizing means to the fuel injected from the fuel injecting means. The fuel injection means then injects the fuel having been pressurized by the set pressure. When the external load detecting means detects that the load externally applied to the engine is not greater than the prescribed value, the pressure modifying means controls to lower the pressure applied by the fuel pressurizing means, so that the pressure of the fuel supplied to the fuel injection means is lowered. As the fuel pressure decreases, the valve opening speed of the fuel injection means is accelerated compared to the case where the fuel pressure is high. Thus, it is possible to shorten the time required for the valve to fully open, and stabilize the quantity of the fuel injected in the short injection period.

Of the injectors, the in-cylinder injector is attached to the cylinder head with its injection hole open to the combustion chamber. This means that the part near the injection hole is likely to suffer a high temperature compared to the intake manifold injector. When the part of the in-cylinder injector near the injection hole suffers a high temperature, needle, sheet and others will expand, resulting in the fuel injection quantity less than its target value. This problem is more serious at the time when fuel injection is being conducted only through the intake manifold injector, since the fuel within the in-cylinder injector hardly moves and the fuel and the in-cylinder injector both suffer a high temperature.

Thus, immediately after switching from the fuel injection through the intake manifold injector to the fuel injection through the in-cylinder injector, the fuel injection quantity becomes less than its target value, even though temporarily, due to the expansion of the in-cylinder injector. This inevitably leads to a leaner air-fuel ratio.

Meanwhile, in the fuel injection control apparatus for an internal combustion engine described in Japanese Patent Laying-Open No. 09-021369, the fuel pressure is decreased during the low load operation, which is considered to decrease noise and vibration (NV) of the fuel-supply system attributable to high pressure. Further, in the low load operation, the quantity of the fuel injected from the in-cylinder injector may be decreased, or fuel injection from the in-cylinder injector may even be stopped. The fuel may be injected only through the intake manifold injector ensuring more uniform fuel supply, or the quantity of the fuel injected from the intake manifold injector may be increased.

If the quantity of the fuel injected from the in-cylinder injector is decreased or fuel injection therefrom is even stopped, however, the temperature at the tip end of the in-cylinder injector increases, because it is not cooled by the fuel passing therethrough. In such a case, the temperature of the injection hole at the tip end of the in-cylinder injector will increase, and deposits will gradually block the hole.

SUMMARY OF THE INVENTION

The present invention has been made to solve the above-described conventional problems. An object of the present invention is to provide a fuel supply apparatus for an internal combustion engine capable of suppressing variation in fuel injection quantity of the in-cylinder injector and maintaining a good combustion state and favorable exhaust emission.

Another object of the present invention is to provide a fuel supply apparatus for an internal combustion engine capable of suppressing formation of deposits in the injection hole of the in-cylinder injector.

An apparatus according to an aspect of the present invention is a fuel supply apparatus for an internal combustion engine having a first fuel injection mechanism for injecting fuel into a cylinder and a second fuel injection mechanism for injecting fuel into an intake manifold, and includes: a temperature monitoring unit for monitoring a temperature at a tip end of the first fuel injection mechanism; and a control unit for increasing a quantity of the fuel circulated through a high-pressure fuel system supplying the fuel to the first fuel injection mechanism when the temperature at the tip end obtained by the temperature monitoring unit is not lower than a reference temperature.

According to the invention, when the temperature near the injection hole at the tip end of the in-cylinder injector identified as the first fuel injection mechanism becomes a reference temperature or higher, the quantity of the fuel circulated through the in-cylinder injection fuel supply system including the in-cylinder injection delivery pipe to which the in-cylinder injector is attached, is increased. For example, when there is no fuel circulated through the in-cylinder injection fuel system as in the case where fuel injection is being conducted only from the intake manifold injector identified as the second fuel injection mechanism, fuel supply by circulation thereof is initiated. When there is the fuel circulated through the in-cylinder injection fuel system as in the case where fuel injection is conducted not only from the intake manifold injector but also from the in-cylinder injector in a relatively small quantity, the quantity of the fuel circulated is increased. With the increased quantity of the fuel circulated, temperature increase of the fuel being supplied to the in-cylinder injector is restricted, and the fuel can cool the in-cylinder injector, particularly its part near the injection hole. As a result, expansion of the part of the in-cylinder injector near the injection hole is suppressed, the quantity of the fuel injected into the combustion chamber of the internal combustion engine can be controlled with accuracy, and accordingly, a good combustion state and favorable exhaust emission can be maintained.

Preferably, the temperature monitoring unit monitors the temperature at the tip end based on a fuel temperature in the high-pressure fuel system.

According to the invention, the temperature near the injection hole at the tip end of the in-cylinder injector is monitored based on the temperature of the fuel in the high-pressure fuel system that supplies fuel to the in-cylinder injector. The in-cylinder injector is filled with the fuel, and thus, the temperature of the fuel and the temperature near the injection hole are approximately equal to each other. Accordingly, it is possible to monitor the temperature near the injection hole with accuracy by monitoring the temperature of the fuel within the in-cylinder injector fuel supply system. Further, when a fuel temperature detecting sensor existing in the in-cylinder injection fuel supply system can be shared for this purpose, the configuration can further be simplified.

More preferably, the temperature monitoring unit estimates the fuel temperature based on a coolant temperature of the internal combustion engine and duration of fuel injection through the second fuel injection mechanism alone.

According to the invention, the temperature of the fuel within the high-pressure fuel system supplying the fuel to the in-cylinder injector is estimated based on the coolant temperature of the internal combustion engine and the duration in which fuel injection is conducted only through the intake manifold injector identified as the second fuel injection mechanism. The coolant temperature of the internal combustion engine corresponds to the engine temperature, and it can be estimated that the fuel temperature of the high-pressure fuel system will be higher as the coolant temperature (engine temperature) is higher. Further, when the duration in which fuel injection is conducted only through the intake manifold injector is long, fuel supply to the in-cylinder injector is stopped for a long time, and thus, it can be estimated that the temperature of the in-cylinder injector will increase with the stagnant high-temperature fuel. As such, the fuel temperature can be estimated with high accuracy from the coolant temperature and the fuel injection duration.

More preferably, the control unit determines a time period during which fuel circulation is conducted in the state where the quantity of the fuel circulated is increased, based on the fuel temperature obtained by the temperature monitoring unit.

According to the invention, the fuel of the increased quantity is circulated during the time period determined based on the fuel temperature in the high-pressure fuel system. With this configuration, compared, e.g., to the case where fuel is circulated through the high-pressure fuel system over the entire time period during which the internal combustion engine is driven by fuel injection from the intake manifold injector alone, the driving loss due to the circulation operation can be reduced, and thus, the in-cylinder injector can be cooled efficiently.

More preferably, the control unit increases the quantity of the circulated fuel when the temperature at the tip end is not lower than the reference temperature and when the fuel injection is being carried out through the second fuel injection mechanism alone.

According to the invention, when the temperature near the injection hole is not lower than the reference temperature and the fuel injection is being conducted only from the intake manifold injector, the circulated quantity of the fuel is increased. With this configuration, compared to the case where fuel is circulated through the high-pressure fuel system over the entire time period during which the internal combustion engine is driven by fuel injection from only the intake manifold injector, for example, the driving loss due to the circulation operation can be reduced, and thus, the in-cylinder injector can be cooled efficiently.

More preferably, the high-pressure fuel system includes the first fuel injection mechanism, a delivery pipe to which the first fuel injection mechanism is attached, a low-pressure fuel pump for supplying fuel from a fuel tank, a high-pressure fuel pump for further pressurizing the fuel from the low-pressure fuel pump and supplying the high-pressure fuel to the delivery pipe, a relief path for relieving the fuel from the delivery pipe to the fuel tank, and a relief valve provided at the relief path. The control unit increases the quantity of the fuel circulated, by opening the relief valve and by increasing the quantity of the high-pressure fuel supplied from the high-pressure fuel pump.

According to the invention, the fuel supplied from the fuel tank by the low-pressure fuel pump is pressurized by the high-pressure fuel pump before being supplied to the in-cylinder injection delivery pipe. When the relief valve provided at the relief path is opened, the fuel is relieved from the in-cylinder injection delivery pipe to the fuel tank. This realizes circulation of the fuel. The quantity of the fuel circulated increases when the quantity of the high-pressure fuel supplied from the high-pressure fuel pump is increased. Thus, by making the high-pressure fuel circulated, fuel injection can be effected immediately when switching from the fuel injection through the intake manifold injector to the fuel injection through the in-cylinder injector. Further, by making the high-pressure fuel circulated, the fuel of a greater quantity is circulated compared to the case where the low-pressure fuel is circulated, whereby cooling of the in-cylinder injector is accelerated. Still further, by making the high-pressure fuel circulated, the fuel is circulated even in the case where fuel is injected in a small quantity from the in-cylinder injector as well. Accordingly, expansion of the part of the in-cylinder injector near the injection hole can be suppressed, and thus, proper fuel injection is ensured.

More preferably, the high-pressure fuel system includes the first fuel injection mechanism, a delivery pipe to which the first fuel injection mechanism is attached, a low-pressure fuel pump for supplying fuel from a fuel tank, a high-pressure fuel pump for further pressurizing the fuel from the low-pressure fuel pump and supplying the high-pressure fuel to the delivery pipe, a relief path for relieving the fuel from the delivery pipe to the fuel tank, and a relief valve provided at the relief path. The control unit increases the quantity of the fuel circulated, by opening the relief valve and by increasing the quantity of the fuel supplied from the low-pressure fuel pump, while suppressing the pressurization of the fuel by the high-pressure fuel pump.

According to the invention, the fuel supplied from the fuel tank by the low-pressure fuel pump is provided to the in-cylinder injection delivery pipe as the fuel of low pressure, without being pressurized by the high-pressure fuel pump. Thus, when the relief valve provided at the relief path is opened, the fuel is relieved from the in-cylinder injection delivery pipe to the fuel tank. This realizes circulation of the fuel. Thus, by making the low-pressure fuel circulated, the fuel circulation can be effected without applying large load to the internal combustion engine.

An apparatus according to another aspect of the present invention is a fuel supply apparatus for an internal combustion engine having a first fuel injection mechanism for injecting fuel into a cylinder, and a second fuel injection mechanism for injecting fuel into an intake manifold, which includes: a pressure monitoring unit for monitoring a pressure of the fuel in the first fuel injection mechanism; a relief unit for externally relieving fuel within a delivery pipe to which the first fuel injection mechanism is attached; and a control unit for actuating the relief unit when the fuel pressure obtained by the pressure monitoring unit is not lower than a reference pressure to relieve the fuel within the delivery pipe so as to decrease the fuel pressure, and for stopping the relief unit when the fuel pressure becomes a critical pressure for fuel injection in minimum injection quantity of the first fuel injection mechanism.

According to the invention, when the fuel pressure within the in-cylinder injector identified as the first fuel injection mechanism becomes equal to or greater than the reference pressure, the fuel within the in-cylinder injection delivery pipe to which the in-cylinder injector is attached is externally relieved. With such relief of the fuel, the pressure of the fuel being supplied to the in-cylinder injector can be lowered. When the fuel pressure attains the critical pressure for fuel injection in minimum injection quantity of the first fuel injection mechanism, the relief of the fuel is stopped. Thus, by ensuring the critical pressure for fuel injection in minimum injection quantity, the fuel injection with the minimum injection quantity can readily be carried out. Further, as the fuel pressure increases, the fuel temperature increases as well. The relief of the fuel can suppress the temperature increase of the fuel being supplied to the in-cylinder injector, and also cool the in-cylinder injector, particularly its part near the injection hole. As a result, expansion of the part of the in-cylinder injector near the injection hole is suppressed, and the quantity of the fuel injected to the combustion chamber of the internal combustion engine can be controlled with accuracy, whereby a good combustion state and favorable exhaust emission are maintained.

Preferably, the relief unit includes a low-pressure fuel pump for supplying fuel from a fuel tank, a high-pressure fuel pump for further pressurizing the fuel from the low-pressure fuel pump and supplying the high-pressure fuel to the delivery pipe, a relief path for relieving the fuel from the delivery pipe to the fuel tank, and a relief valve provided at the relief path. When the fuel pressure obtained by the pressure monitoring unit becomes equal to or greater than a reference pressure, the control unit opens the relief valve to relieve the fuel within the delivery pipe and also actuates the high-pressure fuel pump for a prescribed period of time to supply the high-pressure fuel to the delivery pipe. After a lapse of a predetermined period of time, it supplies the low-pressure fuel from the low-pressure fuel pump to the delivery pipe. When the fuel pressure obtained by the pressure monitoring unit attains the critical pressure for fuel injection in minimum injection quantity, the control unit closes the relief valve to stop the relief of the fuel.

According to the invention, when the fuel pressure within the in-cylinder injector becomes equal to or greater than the reference pressure, the fuel in the in-cylinder injection delivery pipe to which the in-cylinder injector is attached is externally relieved, and also the high-pressure fuel form the high-pressure fuel pump is supplied to the in-cylinder injection delivery pipe for a prescribed period of time. After a lapse of a predetermined period of time, the low-pressure fuel from the low-pressure fuel pump is circulated until the fuel pressure attains the critical pressure for fuel injection in minimum injection quantity. Thus, by making the high-pressure fuel circulated firstly, compared to the case where the low-pressure fuel is circulated, cooling of the fuel supplied to the in-cylinder injector as well as cooling of the in-cylinder injector can be accelerated.

More preferably, the relief unit includes a low-pressure fuel pump for supplying fuel from a fuel tank, a high-pressure fuel pump for further pressurizing the fuel from the low-pressure fuel pump and supplying the high-pressure fuel to the delivery pipe, a relief path for relieving the fuel from the delivery pipe to the fuel tank, and a relief valve provided at the relief path. When the fuel pressure obtained by the pressure monitoring unit is equal to or greater than a reference pressure, the control unit opens the relief valve to relieve the fuel within the delivery pipe, and also supplies the fuel of low pressure from the low-pressure fuel pump to the delivery pipe. When the fuel pressure obtained by the pressure monitoring unit becomes the critical pressure for fuel injection in minimum injection quantity, the control unit closes the relief valve to stop the relief of the fuel.

According to the invention, when the fuel pressure within the in-cylinder injector becomes equal to or greater than the reference pressure, the fuel in the in-cylinder injection delivery pipe to which the in-cylinder injector is attached is externally relieved, and the low-pressure fuel from the low-pressure fuel pump is supplied to the in-cylinder injection delivery pipe. As the low-pressure fuel is circulated in this manner, the fuel pressure within the in-cylinder injector can be lowered quickly to the critical pressure for fuel injection in minimum injection quantity.

An apparatus according to a further aspect of the present invention is a fuel supply apparatus for an internal combustion engine having a first fuel injection mechanism for injecting fuel into a cylinder, and a second fuel injection mechanism for injecting fuel into an intake manifold, wherein a high-pressure fuel system for supplying the fuel to the first fuel injection mechanism includes a high-pressure fuel pump. The fuel supply apparatus includes: an injection control unit for controlling the fuel injection mechanisms such that fuel injection is carried out using one or both of the first and second fuel injection mechanisms based on a condition required for the internal combustion engine; and a control unit for controlling the high-pressure fuel pump. The control unit controls the high-pressure fuel pump such that the fuel is supplied from the high-pressure fuel pump even in a region where the first fuel injection mechanism is stopped.

According to the invention, even in the region where fuel injection from the in-cylinder injector identified as the first fuel injection mechanism is stopped, the fuel is discharged from the high-pressure fuel pump supplying the fuel into the in-cylinder injector. The fuel discharged from the high-pressure fuel pump is supplied via the high-pressure delivery pipe to the in-cylinder injector. Conventionally, in the region where the fuel is not injected from the in-cylinder injector, the fuel would not be supplied from the high-pressure fuel pump via the high-pressure delivery pipe to the in-cylinder injector (for example, the electromagnetic spill valve is left open). In contrast, according to the invention, the fuel is delivered to the in-cylinder injector, thereby cooling the tip end of the in-cylinder injector. When the tip end is cooled, the injection hole of the in-cylinder injector arranged to protrude to the combustion chamber is also cooled, whereby formation of deposits is suppressed. At the end of the high-pressure delivery pipe, a relief valve, for example, is provided, through which the fuel is returned to the fuel tank. As a result, it is possible to provide a fuel supply apparatus for an internal combustion engine that can suppress formation of the deposits otherwise accumulated in the injection hole of the in-cylinder injection mechanism.

Preferably, the fuel supply apparatus further includes an estimation unit for estimating a temperature at the tip end of the first fuel injection mechanism, and the control unit controls the high-pressure fuel pump based on the temperature at the tip end.

According to the invention, the temperature at the tip end of the in-cylinder injector is estimated based on the operation state of the internal combustion engine. The quantity of the fuel discharged from the high-pressure fuel pump is determined such that the estimated temperature at the tip end will not attain a high temperature permitting formation of the deposits. The in-cylinder injector can be cooled by the fuel, and thus, formation of deposits can be suppressed.

An apparatus according to yet another aspect of the present invention is a fuel supply apparatus for an internal combustion engine having a first fuel injection mechanism for injecting fuel into a cylinder and a second fuel injection mechanism for injecting fuel into an intake manifold, wherein a high-pressure fuel system for supplying the fuel to the first fuel injection mechanism includes a high-pressure fuel pump. The fuel supply apparatus includes: an injection control unit for controlling the fuel injection mechanisms such that fuel injection is carried out using one or both of the first and second fuel injection mechanisms based on a condition required for the internal combustion engine; an estimating unit for estimating a temperature at a tip end of the first fuel injection mechanism; and a control unit for controlling the high-pressure fuel pump. The control unit controls the high-pressure fuel pump such that the fuel is supplied from the high-pressure fuel pump based on the temperature at the tip end, even when the quantity of the fuel injected from the first fuel injection mechanism is decreased.

According to the invention, even in the region where the quantity of the fuel injected from the in-cylinder injector identified as the first fuel injection mechanism is reduced, the fuel is injected from the high-pressure fuel pump supplying the fuel to the in-cylinder injector, in a quantity calculated based on the temperature at the tip end of the in-cylinder injector. That is, even if the quantity of the fuel injected form the in-cylinder injector is reduced, the quantity of the fuel supplied from the high-pressure fuel pump is not reduced, so as to supply the fuel of a large quantity via the high-pressure delivery pipe to the in-cylinder injector. Conventionally, the quantity of the fuel supplied from the high-pressure fuel pump via the high-pressure delivery pipe to the in-cylinder injector would be decreased in the region where the fuel is not injected from the in-cylinder injector (for example, by retarding the timing to close the electromagnetic spill valve). In contrast, according to the invention, the fuel of a large quantity is supplied to the in-cylinder injector, and the relevant fuel can cool the tip end of the in-cylinder injector. As the tip end is cooled, the injection hole of the in-cylinder injector arranged to protrude to the combustion chamber is cooled as well, whereby accumulation of deposits is suppressed. In the in-cylinder injector, the fuel pressure and the injection duration are controlled to inject the fuel of a desired quantity into the combustion chamber. As a result, it is possible to provide a fuel supply apparatus for an internal combustion engine that can suppress formation of deposits otherwise accumulated in the injection hole of the in-cylinder injection mechanism.

Preferably, the control unit controls a quantity of the fuel discharged from the high-pressure fuel pump such that the temperature at the tip end becomes not higher than a predetermined temperature.

According to the invention, the quantity of the fuel discharged from the high-pressure fuel pump is determined such that the temperature at the tip end will be not higher than a predetermined temperature, or, such that the temperature at the tip end will not become a high temperature permitting formation of deposits. The fuel can cool the in-cylinder injector to suppress formation of deposits.

More preferably, the estimating unit estimates the temperature at the tip end based on at least one of a temperature, an engine speed and a load of the internal combustion engine.

According to the invention, it is possible to accurately estimate the temperature at the tip end based on at least one of the temperature of the internal combustion engine, the engine speed of the internal combustion engine, and the load of the internal combustion engine.

More preferably, the first fuel injection mechanism is an in-cylinder injector, and the second fuel injection mechanism is an intake manifold injector.

According to the invention, it is possible to prevent accumulation of deposits in the injection hole of the in-cylinder injector by separately providing the in-cylinder injector as the first fuel injection mechanism and the intake manifold injector as the second fuel injection mechanism.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
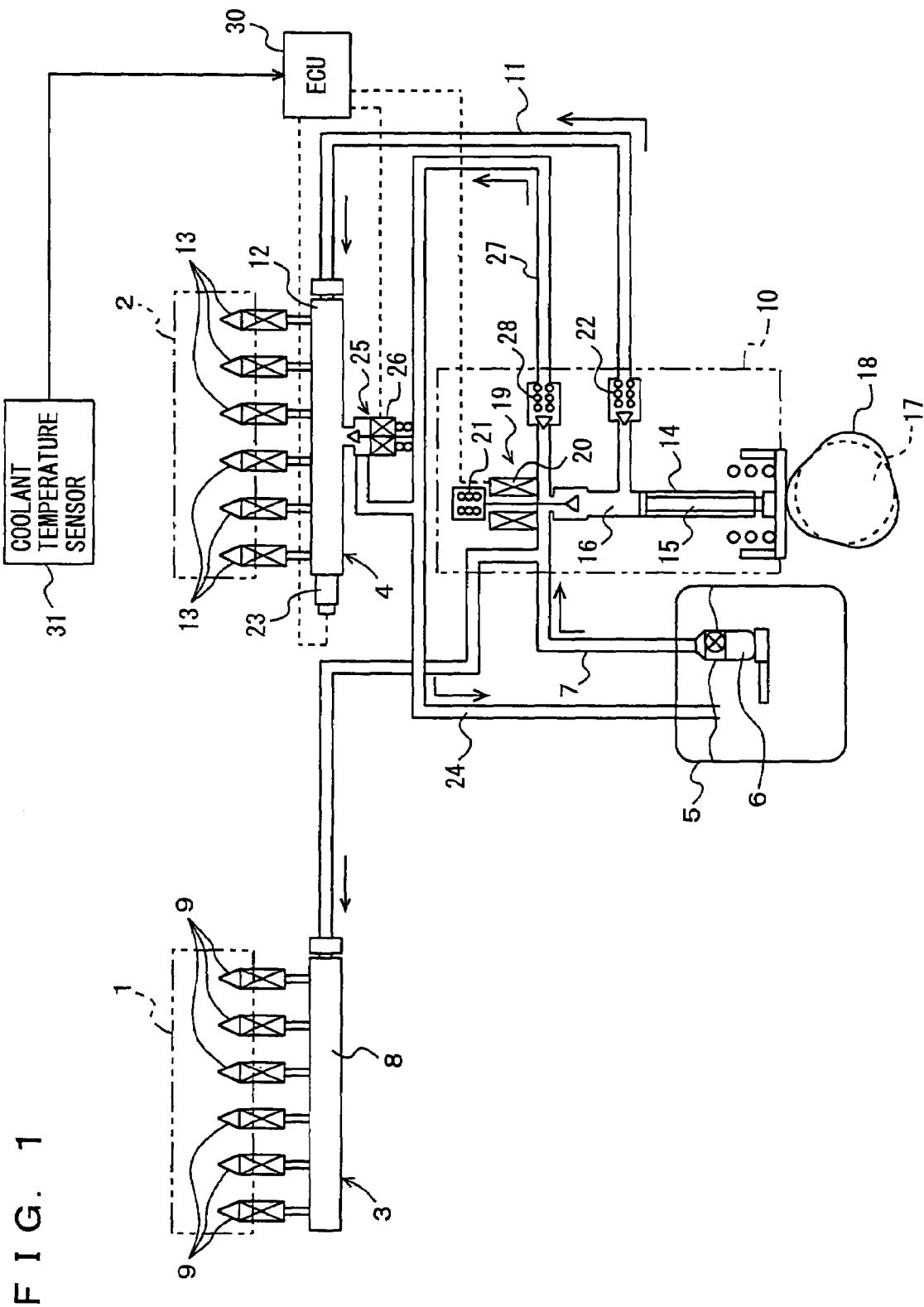
FIG. 1 shows a schematic configuration of a fuel injection apparatus of an internal combustion engine according to a first embodiment of the present invention.

Hereinafter, embodiments of the present invention will be described with reference to the drawings. The same reference characters denote the same portions having the same names and functions, and therefore, detailed description thereof will not be repeated. In the following description, a fuel injection apparatus or a fuel supply system for an internal combustion engine will be described as a fuel supply apparatus for an internal combustion engine.

First Embodiment

A fuel injection apparatus for an internal combustion engine according to the first embodiment of the present invention will now be described with reference to FIGS. 1 and 2. In the present embodiment, a fuel injection apparatus used for a 6-cylinder gasoline engine identified as the internal combustion engine will be described.

Figure 2:
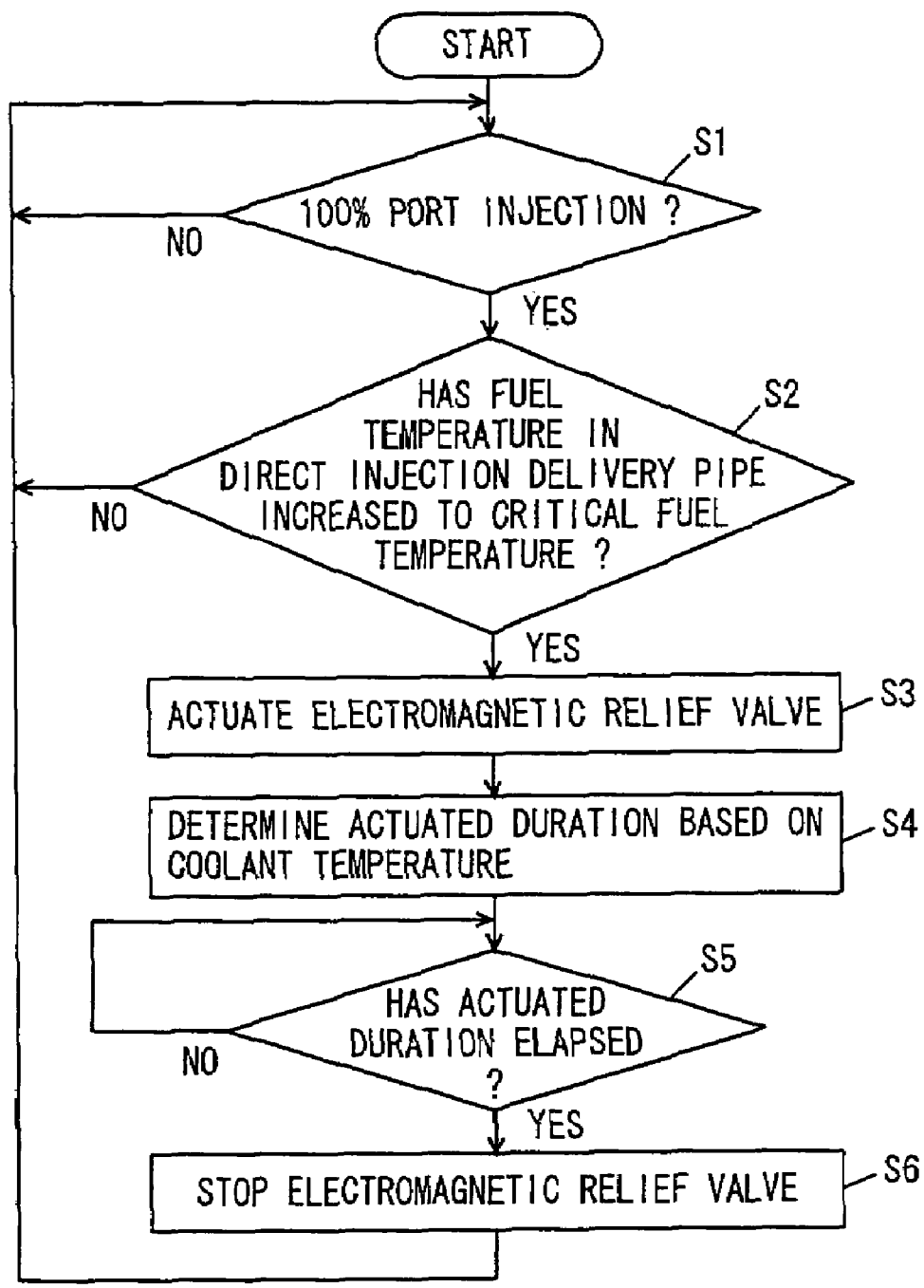
FIG. 2 is a flowchart illustrating a control structure of a program executed by an ECU implementing a control device of the first embodiment.

As shown in FIG. 1, the fuel injection apparatus includes a low-pressure fuel supply system 3 that injects fuel into an intake port 1 to provide an air-fuel mixture, which is supplied to a combustion chamber 2, and a high-pressure fuel supply system 4 that supplies fuel directly into combustion chamber 2. Low-pressure fuel supply system 3 and high-pressure fuel supply system 4 commonly use a low-pressure fuel path 7 through which fuel (referred to as the "low-pressure fuel") is supplied from a fuel tank 5 to a low-pressure fuel pump 6.

Low-pressure fuel supply system 3 includes an intake port fuel delivery pipe 8 connected to low-pressure fuel path 7, and six intake manifold injectors 9 attached to intake port delivery pipe 8. In low-pressure fuel supply system 3, the low-pressure fuel supplied by low-pressure fuel pump 6 through low-pressure fuel path 7 is injected into intake port 1 via intake manifold injector 9.

High-pressure fuel supply system 4 includes a high-pressure fuel pump 10 connected to low-pressure fuel path 7, a high-pressure fuel path 11 through which fuel supplied from high-pressure fuel pump 10 (referred to as the "high-pressure fuel") flows, an in-cylinder injection fuel delivery pipe 12 connected to high-pressure fuel path 11, and six in-cylinder injectors 13 attached to in-cylinder injection delivery pipe 12. In high-pressure fuel supply system 4, the high-pressure fuel supplied from high-pressure fuel pump 10 through high-pressure fuel path 11 is injected into combustion chamber 2 via in-cylinder injector 13.

High-pressure fuel pump 10 includes a cylinder 14, a plunger 15 performing a reciprocating motion within cylinder 14, and a pressurizing chamber 16 delimited by cylinder 14 and plunger 15. Plunger 15 moves in a reciprocal manner within cylinder 14 in accordance with rotation of a cam 18 attached to an exhaust camshaft 17. Pressurizing chamber 16 is connected to both low-pressure fuel path 7 and high-pressure fuel path 11.

High-pressure fuel pump 10 also includes an electromagnetic spill valve 19 that connects/disconnects pressurizing chamber 16 to/from low-pressure fuel path 7. Electromagnetic spill valve 19 has an electromagnetic solenoid 20, and a voltage applied to electromagnetic solenoid 20 is controlled to open/close the valve 19. Specifically, when electromagnetic solenoid 20 is not electrified, electromagnetic spill valve 19 is open by a bias force of a coil spring 21, so that low-pressure fuel path 7 is connected to pressurizing chamber 16. When electromagnetic solenoid 20 is electrified, electromagnetic spill valve 19 is closed against the coil spring 21, whereby low-pressure fuel path 7 is disconnected from pressurizing chamber 16.

With high-pressure fuel pump 10 having the above configuration, when plunger 15 moves in the direction increasing the volume of pressurizing chamber 16 (in the suction stroke), electromagnetic spill valve 19 is opened to connect low-pressure fuel path 7 to pressurizing chamber 16. Thus, the low-pressure fuel supplied from fuel tank 5 by low-pressure fuel pump 6 is suctioned from low-pressure fuel path 7 into pressurizing chamber 16. Subsequently, when plunger 15 moves in the direction decreasing the volume of pressurizing chamber 16 (in the delivery stroke), electromagnetic spill valve 19 is closed to disconnect low-pressure fuel path 7 from pressurizing chamber 16. Thus, the fuel within pressurizing chamber 16 is pressurized, and the resultant high-pressure fuel is delivered to high-pressure fuel path 11.

High-pressure fuel path 11 is provided with a check valve 22, and is connected to in-cylinder injection delivery pipe 12. The high-pressure fuel from high-pressure fuel pump 10 opens check valve 22, and is supplied via high-pressure fuel path 11 into in-cylinder injection delivery pipe 12. As check valve 22, one that would not be opened with the low-pressure fuel supplied from low-pressure fuel pump 6 is used.

Six in-cylinder injectors 13 are attached to in-cylinder injection delivery pipe 12, and the high-pressure fuel supplied to in-cylinder injection delivery pipe 12 is directly injected from each in-cylinder injector 13 into a corresponding combustion chamber 2. Further, in-cylinder injection delivery pipe 12 is provided with a fuel pressure sensor 23 for detecting a pressure of the high-pressure fuel in in-cylinder injection delivery pipe 12. The fuel pressure detected by fuel pressure sensor 23 is input to an ECU (Electronic Control Unit) 30, which will be described later.

Furthermore, in-cylinder injection delivery pipe 12 is connected to fuel tank 5 via a relief path 24. Relief path 24 has an electromagnetic relief valve 25 provided at its end on the side of in-cylinder injection delivery pipe 12. Electromagnetic relief valve 25 is opened/closed as a voltage applied to an electromagnetic solenoid 26 is controlled. When electromagnetic relief valve 25 is opened, the high-pressure fuel within in-cylinder injection delivery pipe 12 is relieved to fuel tank 5, whereby the fuel pressure within in-cylinder injection delivery pipe 12 is maintained at an appropriate level.

At the position where low-pressure fuel path 7 is connected to pressurizing chamber 16, a relief path 27 is connected, which is provided with a check valve 28. This relief path 27 is connected to relief path 24. When the fuel pressure in low-pressure fuel path 7 increases due to an excessive quantity of the low-pressure fuel supplied, check valve 28 opens, and the low-pressure fuel is relieved through relief paths 27 and 24 to fuel tank 5.

The fuel injection apparatus with the above-described configuration is controlled by ECU 30 serving as the control means formed of various devices of CPU, ROM, RAM, ASIC, I/F and others. The ROM of ECU 30 stores a program for controlling the fuel injection apparatus as one of various programs for control of the internal combustion engine. Further, the ROM of ECU 30 stores a map wherein the coolant temperature of the internal combustion engine and the duration of fuel injection using only intake manifold injectors 9 are correlated with the fuel temperature within in-cylinder injection delivery pipe 12. ECU 30 receives output signals from various sensors including a coolant temperature sensor 31 for detecting the coolant temperature of the internal combustion engine and fuel pressure sensor 23. Coolant temperature sensor 31 and ECU 30 constitute the temperature monitoring means.

ECU 30 controls the internal combustion engine in accordance with the various programs based on the output signals from the sensors. For the fuel injection apparatus, ECU 30 controls the opening/closing operations of electromagnetic spill valve 19 and electromagnetic relief valve 25, the fuel injection timings of intake manifold injectors 9 and in-cylinder injectors 13, and others.

The fuel injection apparatus of the first embodiment is configured to monitor a temperature in the vicinity of the injection hole of in-cylinder injector 13, and, when the temperature near the injection hole obtained by monitoring is higher than a reference temperature, increase the quantity of the fuel circulated through high-pressure fuel system 4. For example, in the state where fuel injection is being conducted only through intake manifold injectors 9 with no move or circulation of the fuel within high-pressure fuel supply system 4, circulation of the fuel is effected. A specific control procedure for performing such fuel circulation will now be described with reference to FIG. 2.

When the control of the fuel injection apparatus by ECU 30 is initiated, in step (hereinafter, abbreviated as "S") 1, it is determined whether it is a 100% port injection state. Here, the 100% port injection state refers to the state in which fuel injection is carried out only through intake manifold injectors 9.

The fuel injection state is determined based on the engine load, which is, e.g., the degree of press down of an accelerator pedal. For example, in a low load operation where the degree of press down is smaller than a first reference value, the fuel injection is carried out only through in-cylinder injectors 13. In a high load operation where the degree of press down is greater than a second reference value, the fuel injection is carried out only through intake manifold injectors 9. In an intermediate load operation with the degree of press down of not lower than the first reference value and not greater than the second reference value, the fuel injection is carried out using both in-cylinder injectors 13 and intake manifold injectors 9, at a prescribed ratio of 20%:80%, for example. As such, whether it is the 100% port injection state or not can be determined based on the engine load, e.g., the degree of press down of the accelerator pedal.

If YES in S1, the process goes to S2. In S2, it is determined whether a fuel temperature in direct injection delivery pipe has increased to a critical fuel temperature. Here, the fuel temperature in direct injection delivery pipe refers to the temperature of the fuel within in-cylinder injection delivery pipe 12. The critical fuel temperature corresponds to the reference temperature.

Although it would be most desirable to directly detect the temperature near the injection hole of in-cylinder injector 13, in the present embodiment, the temperature of the high-pressure fuel supplied to in-cylinder injector 13, i.e., the temperature of the high-pressure fuel within in-cylinder injection delivery pipe 12, is obtained. Further, instead of directly detecting the temperature of the high-pressure fuel within in-cylinder injection delivery pipe 12, the fuel temperature in direct injection delivery pipe is obtained based on the coolant temperature detected by coolant temperature sensor 31 and the duration of fuel injection using only intake manifold injectors 9, by referring to a map showing the relation between the coolant temperature and the fuel injection duration on one hand and the fuel temperature on the other hand, stored in the ROM of ECU 30. It is then determined whether the fuel temperature obtained has reached the critical fuel temperature.

If YES in S2, the process goes to S3. In S3, electromagnetic relief valve 25 is actuated and opened. In the 100% port injection state, electromagnetic spill valve 19 is always open. Thus, the low-pressure fuel flows into pressurizing chamber 16 in the suction stroke. The fuel within pressurizing chamber 16, however, is pressurized only slightly, since electromagnetic spill valve 19 is open even in the delivery stroke. At this time, the fuel within high-pressure fuel supply system 4 does not move, with electromagnetic relief vale 25 closed. Thus, the fuel within pressurizing chamber 16 is supplied to low-pressure fuel supply system 3, or check valve 28 of relief path 27 opens to relieve the fuel to fuel tank 5.

As such, by opening electromagnetic relief valve 25, the fuel within in-cylinder injection delivery pipe 12 can be relieved to fuel tank 5, and the slightly pressurized fuel within pressurizing chamber 16 is supplied to in-cylinder injection delivery pipe 12 by opening of check valve 22 on high-pressure fuel path 11. In this manner, the fuel is circulated through high-pressure fuel supply system 4.

In S4, duration in which electromagnetic relief valve 25 is actuated, or, the actuated duration of the valve, is determined based on the coolant temperature detected by coolant temperature sensor 31. Specifically, a high coolant temperature means a high engine temperature, and thus, the actuated duration of the valve is set longer. Conversely, a low coolant temperature means a low engine temperature, and thus, the actuated duration of the valve is set shorter.

In S5, it is determined whether the actuated duration of the valve has elapsed. If so, the process goes to S6, where electromagnetic relief valve 25 is closed to stop circulation of the fuel.

If the determination in S2 described above is NO, the process returns to S1. That is, if it is determined that the fuel temperature within in-cylinder injection delivery pipe 12 does not increase to the critical fuel temperature even in the 100% port injection state, circulation of the fuel through high-pressure fuel supply system 4 is not effected.

In the fuel injection apparatus described above, when the fuel injection is being carried out using only intake manifold injectors 9, if it is determined that the fuel temperature within in-cylinder injection delivery pipe 12 has increased to a critical fuel temperature, circulation of the fuel through high-pressure fuel supply system 4 is initiated. The fuel, when moving in high-pressure fuel supply system 4, cools the components thereof. Thus, circulation of the fuel ensures that the fuel of a lower temperature than the temperature in the vicinity of the injection hole is circulated through high-pressure fuel supply system 4. Accordingly, it is possible to cool in-cylinder injector 13 as the component of high-pressure fuel supply system 4 to suppress expansion near the injection hole, so that the quantity of the fuel injected into combustion chamber 2 of the internal combustion engine can be controlled with accuracy.

In the fuel injection apparatus described above, the temperature near the injection hole is monitored based on the fuel temperature within high-pressure fuel supply system 4. Since the fuel is filled in in-cylinder injector 13, the fuel temperature is nearly equal to the temperature near the injection hole. Therefore, by monitoring the fuel temperature within high-pressure fuel supply system 4, the temperature near the injection hole can be monitored with high accuracy.

Further, in the fuel injection apparatus described above where the temperature near the injection hole is monitored based on the fuel temperature within high-pressure fuel supply system 4, the structure is prevented from being complicated, compared to the case where the temperature near the injection hole is directly measured and monitored. That is, in the case where the temperature near the injection hole is directly measured and monitored, the structure would be complicated since a temperature detecting sensor needs to be attached to the in-cylinder injector of a relatively small size. The present embodiment prevents such complication of the structure.

In the fuel injection apparatus described above, the fuel temperature within high-pressure fuel supply system 4 can be estimated with accuracy, since it is estimated based on the coolant temperature of the internal combustion engine detected by coolant temperature sensor 31 and the duration of fuel injection using only intake manifold injectors 9. That is, the coolant temperature of the internal combustion engine corresponds to the engine temperature, and it is estimated that the higher the coolant temperature (engine temperature), the higher the fuel temperature within high-pressure fuel supply system 4. Further, the long duration of fuel injection using only intake manifold injectors 9 means that the fuel supply to in-cylinder injectors 13 is stopped, and it can be estimated that the temperature of the in-cylinder injector is increased due to the stagnant fuel of high temperature. As such, it is possible to accurately estimate the fuel temperature based on the coolant temperature and the fuel injection duration.

Further, the coolant temperature is commonly used for control of the internal combustion engine, which can be detected using coolant temperature sensor 31. The duration of fuel injection using intake manifold injectors 9 is also used for control of the internal combustion engine, which can be obtained by an arithmetic operation or based on a map prepared in advance. As such, both of the coolant temperature and the duration of fuel injection by intake manifold injectors 9 are obtained without any additional configurations, making it readily possible to implement the present embodiment.

In the fuel injection apparatus described above, the fuel is circulated only for a required time period that is determined based on the fuel temperature within high-pressure fuel supply system 4. Thus, compared to the case where the fuel within the in-cylinder injection fuel supply system is circulated over the entire time period during which the internal combustion engine is driven by the fuel injection from intake manifold injectors 9 alone, the driving loss due to the circulation operation is reduced, and in-cylinder injectors 13 can be cooled efficiently. Further, the load of the internal combustion engine can be made small, so that it is possible to efficiently cool in-cylinder injectors 13 while preventing degradation in fuel efficiency due to an increase of friction.

In the fuel injection apparatus described above, when fuel injection is being carried out through intake manifold injectors 9 alone, if it is determined that the fuel temperature within high-pressure fuel supply system 4 has increased to the level of the critical fuel temperature, the fuel is circulated. Thus, compared to the case where the fuel within the in-cylinder injection fuel supply system is circulated over the entire time period during which the internal combustion engine is driven by the fuel injection from only intake manifold injectors 9, the driving loss due to the circulation operation is reduced, and in-cylinder injectors 13 can be cooled efficiently.

Meanwhile, in a conventional apparatus, when the fuel injection is being carried out only from intake manifold injectors, with no move of the fuel within the in-cylinder injectors, the fuel and the in-cylinder injectors both attain a high temperature, which results in expansion of the parts of the in-cylinder injectors, since no cooling effect by the fuel is expected. For example, upon feedback control of the fuel injection quantity, immediately after switching to the fuel injection through the in-cylinder injectors, the fuel injection quantity becomes less than its target value due to the expansion of the injectors, resulting in too lean a combustion state. Thus, in the conventional apparatus, the target value is set at a higher value to conduct the fuel injection. Thereafter, as the fuel injection from the in-cylinder injectors continues, the injectors are cooled by the fuel being supplied, whereby the expansion of the parts is alleviated. The fuel injection quantity thus becomes greater than the target value, resulting in too rich a combustion state. Thus, in the conventional apparatus, the target value is changed to a lower value to conduct the fuel injection. As described above, in the conventional fuel injection apparatus, the fuel injection quantity would vary when switching from the fuel injection through the intake manifold injectors to the fuel injection through the in-cylinder injectors, which adversely affects the combustion state and the exhaust emission.

In contrast, according to the fuel injection apparatus described above, expansion near the injection hole of in-cylinder injector 13 can be suppressed while fuel injection is being carried out only via intake manifold injector 9, and thus, it is possible to accurately control the fuel injection quantity when switching from the fuel injection through intake manifold injector 9 to the fuel injection through in-cylinder injector 13.

In the fuel injection apparatus described above, the low-pressure fuel supplied from fuel tank 5 is supplied to high-pressure fuel supply system 4 without pressurizing the fuel by high-pressure fuel pump 10, for circulation of the fuel. Thus, the fuel circulation can be carried out without applying high load to the internal combustion engine.

As described above, the fuel injection apparatus according to the first embodiment can provide the following effects.

(1) In the present embodiment, when the fuel injection is being carried out using only intake manifold injectors 9, if it is determined that the fuel temperature within in-cylinder injection delivery pipe 12 has increased to a critical fuel temperature, circulation of the fuel through high-pressure fuel supply system 4 is initiated. Accordingly, it is possible to cool in-cylinder injectors 13 as the components of high-pressure fuel supply system 4 to suppress expansion near the injection holes, so that the quantity of the fuel injected into combustion chambers 2 of the internal combustion engine can be controlled with accuracy. Accordingly, a good combustion state as well as favorable exhaust emission can be maintained.

(2) In the present embodiment, the temperature near the injection hole is monitored based on the fuel temperature within high-pressure fuel supply system 4. Therefore, the temperature near the injection hole can be monitored with high accuracy.

(3) In the present embodiment, the temperature near the injection hole is monitored based on the fuel temperature within high-pressure fuel supply system 4. Thus, complication of the structure is prevented compared to the case where the temperature near the injection hole is directly measured and monitored.

(4) In the present embodiment, the fuel temperature within high-pressure fuel supply system 4 can be estimated with accuracy, since it is estimated based on the coolant temperature of the internal combustion engine detected by coolant temperature sensor 31 and the duration of fuel injection using only intake manifold injectors 9. Further, both of the coolant temperature and the duration of fuel injection by intake manifold injectors 9 are obtained without any additional configurations, so that the present embodiment can readily be implemented.

(5) In the present embodiment, the fuel is circulated only for a required time period that is determined based on the fuel temperature within high-pressure fuel supply system 4. Thus, compared to the case where the fuel is circulated through the in-cylinder injection fuel supply system over the entire time period during which the internal combustion engine is driven by the fuel injection from intake manifold injectors 9 alone, the driving loss due to the circulation operation is reduced, and in-cylinder injectors 13 can be cooled efficiently. Further, the load of the internal combustion engine can be made small, so that it is possible to efficiently cool in-cylinder injectors 13 while preventing degradation in fuel efficiency due to an increase of friction.

(6) In the present embodiment, when fuel injection is being carried out through intake manifold injectors 9 alone, if it is determined that the fuel temperature within high-pressure fuel supply system 4 has increased to the level of the critical fuel temperature, fuel circulation is effected. Thus, compared to the case where the fuel is circulated through the in-cylinder injection fuel supply system over the entire time period during which the internal combustion engine is driven by the fuel injection from only intake manifold injectors 9, the driving loss due to the circulation operation is reduced, and in-cylinder injectors 13 can be cooled efficiently. Further, expansion near the injection hole of in-cylinder injector 13 can be suppressed while fuel injection is being carried out only through intake manifold injector 9. Accordingly, it is possible to accurately control the fuel injection quantity when switching from the fuel injection through intake manifold injectors 9 to the fuel injection through in-cylinder injectors 13.

(7) In the present embodiment, the low-pressure fuel supplied from fuel tank 5 is supplied to high-pressure fuel supply system 4 without pressurizing the fuel by high-pressure fuel pump 10, for circulation of the fuel. Thus, the fuel circulation can be carried out without applying high load to the internal combustion engine.

It is noted that the first embodiment may be modified as follows.

When the fuel temperature is increased, the fuel pressure is also increased, in which case electromagnetic relief valve 25 may be opened to relieve the fuel to fuel tank 5 so as to lower the fuel pressure. Thus, it may be configured such that, after initiation of fuel circulation, the fuel circulation is stopped when the fuel pressure detected by fuel pressure sensor 23 (fuel pressure within in-cylinder injection delivery pipe 12) becomes a critical fuel pressure for fuel injection in minimum injection quantity that ensures fuel injection from in-cylinder injector 13 with the minimum injection quantity. With this control, when switching to the fuel injection through in-cylinder injectors 13, the fuel injection can be carried out with the minimum injection quantity.

In the above embodiment, the low-pressure fuel supplied from fuel tank 5 is circulated without pressurizing the same by high-pressure fuel pump 10. Alternatively, the low-pressure fuel may be pressurized by high-pressure fuel pump 10, and the resultant high-pressure fuel may be circulated. When the high-pressure fuel is circulated, the fuel injection can be effected immediately after switching from the fuel injection through intake manifold injectors 9 to the fuel injection through in-cylinder injectors 13. Further, when the high-pressure fuel is circulated, the fuel of a greater quantity is circulated compared to the case where the low-pressure fuel is circulated, whereby cooling of in-cylinder injectors 13 is accelerated. Still further, when the high-pressure fuel is circulated, the fuel can be circulated even when fuel injection of a small quantity from in-cylinder injectors 13 is being carried out. This suppresses expansion of the part of in-cylinder injector 13 near the injection hole due to the small quantity of the injected fuel and hence insufficient cooling of in-cylinder injector 13, and accordingly, proper fuel injection is ensured.

When the high-pressure fuel is circulated as described above, although the fuel injection can be carried out immediately after switching from the fuel injection through intake manifold injectors 9 to the fuel injection through in-cylinder injectors 13, the fuel of a large quantity will be injected if the fuel pressure is too high, making it difficult to achieve fuel injection from in-cylinder injector 13 with the minimum injection quantity. In view of the foregoing, it may be configured such that, after circulation of the high-pressure fuel for a prescribed time period, high-pressure fuel pump 10 is stopped to conduct circulation of the low-pressure fuel, and thereafter, electromagnetic relief valve 25 is closed to stop circulation of the fuel when the fuel pressure detected by fuel pressure sensor 23 attains the critical fuel pressure for fuel injection in minimum injection quantity. With this control, the fuel injection with the minimum injection quantity is ensured when switching to the fuel injection through in-cylinder injectors 13.

In the above embodiment, the fuel is circulated in the 100% port injection state where fuel injection is carried out from only intake manifold injectors 9. Alternatively, it may be configured such that the fuel circulation is effected, not only in the state where the fuel is injected only through intake manifold injectors 9, but also in the state where the fuel of a relatively small quantity is injected from in-cylinder injectors 13 as well. This corresponds to the case where fuel injection is carried out, e.g., 80% from intake manifold injectors 9 and 20% from in-cylinder injectors 13, although in this case it is necessary to circulate the high-pressure fuel as described above, since the fuel injection is to be carried out through in-cylinder injectors 13 as well.

In the above embodiment, the fuel temperature within in-cylinder injection delivery pipe 12 is obtained based on the coolant temperature and the duration of fuel injection through only intake manifold injectors 9, by referring to a map. Alternatively, the fuel temperature may be measured directly using a temperature sensor.

In the above embodiment, the temperature near the injection hole of in-cylinder injector 13 is monitored based on the fuel temperature within in-cylinder injection delivery pipe 12. Alternatively, a temperature sensor may be used to directly measure the temperature near the injection hole.

Second Embodiment

Figure 3:
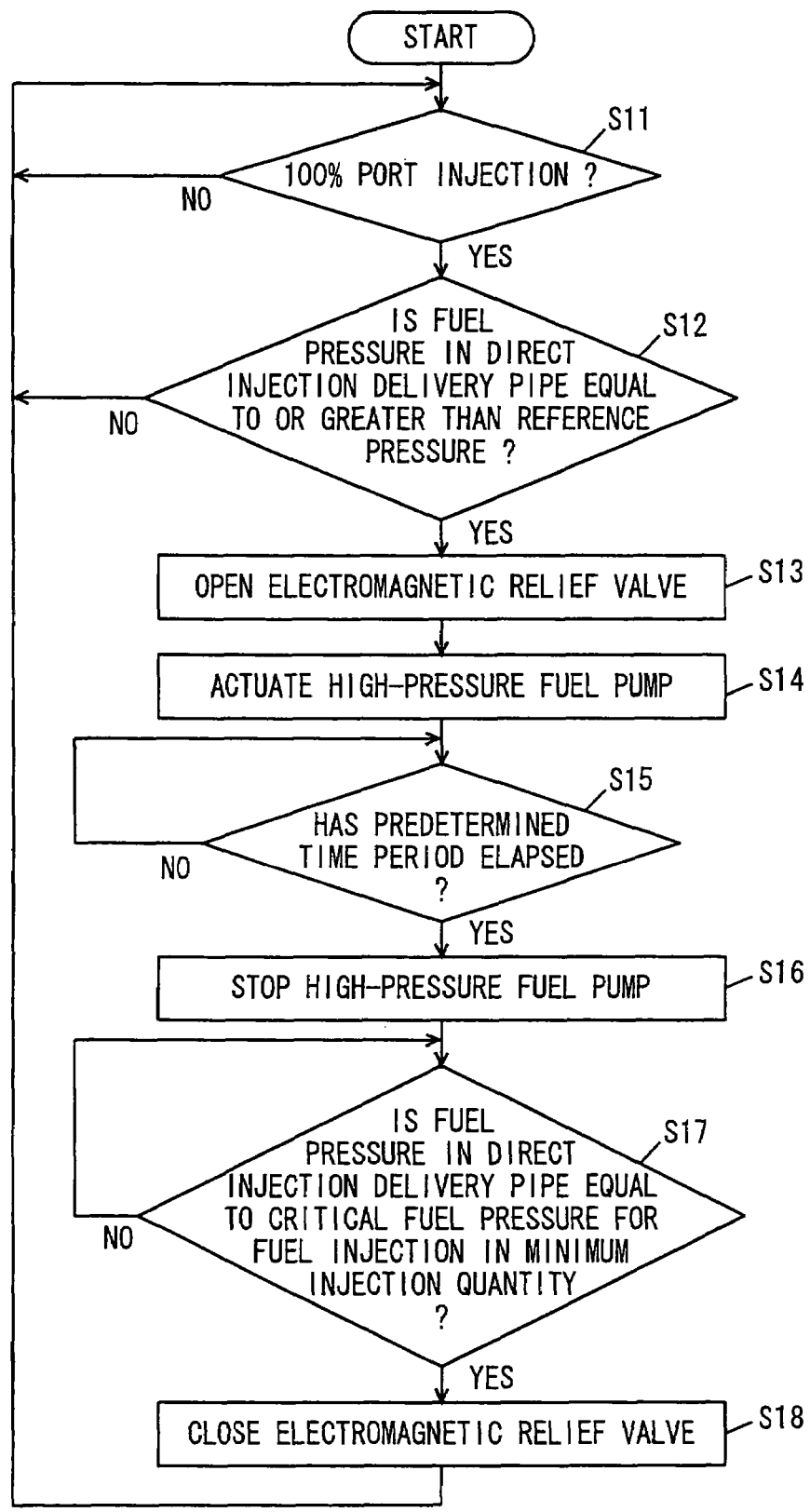
FIG. 3 is a flowchart illustrating a control structure of a program executed by an ECU implementing a control device of a second embodiment of the present invention.
Figure 4:
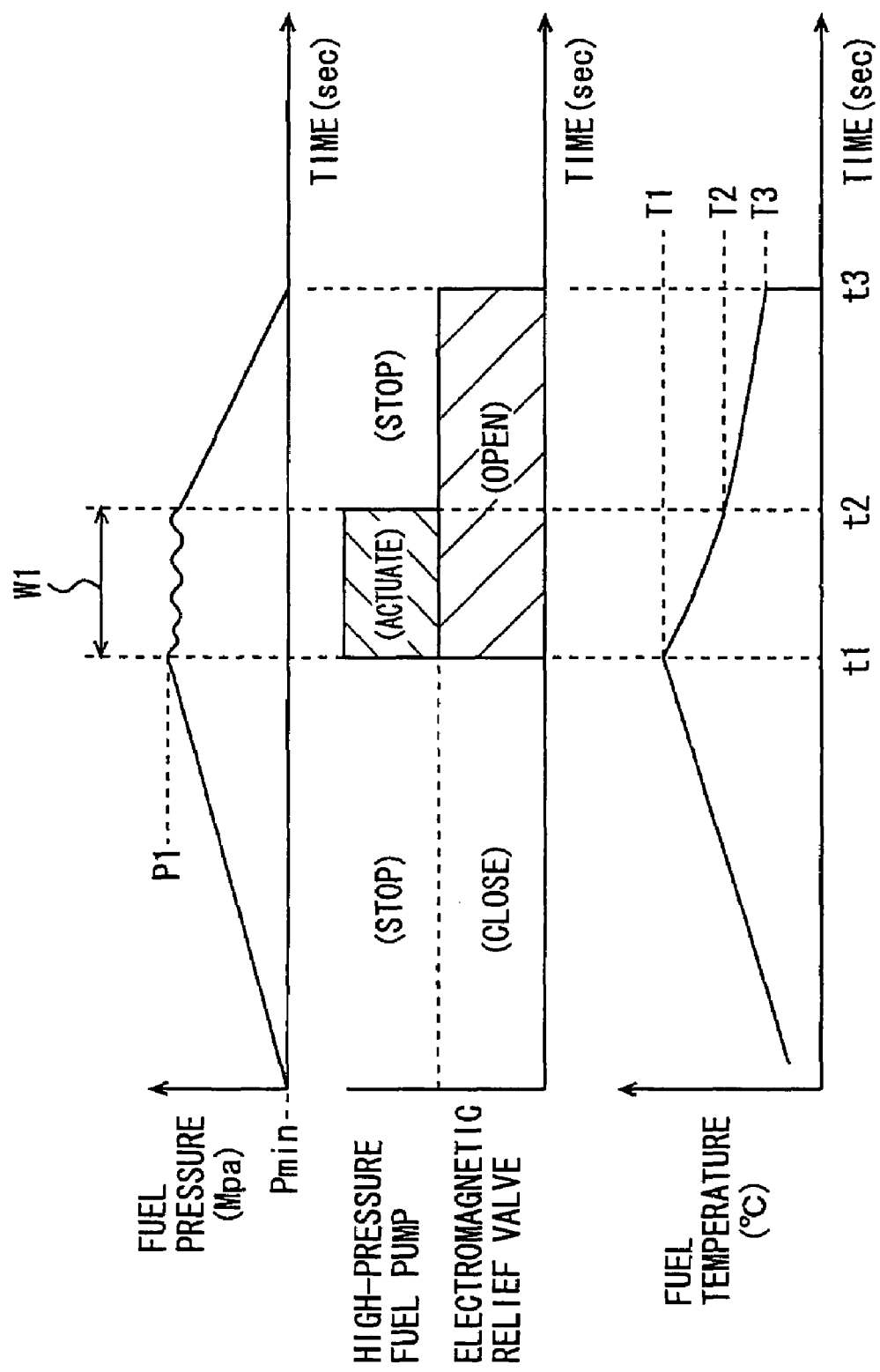
FIG. 4 is a timing chart illustrating control states in the second embodiment.

The second embodiment of the present invention will now be described with reference to FIGS. 3 and 4. The configuration of the fuel injection apparatus for the internal combustion engine according to the second embodiment is identical to the configuration shown in FIG. 1, and thus, detailed description thereof will not be repeated. The control procedure in the fuel injection apparatus is now described. FIG. 3 is a flowchart illustrating the control procedure in the second embodiment, and FIG. 4 is a timing chart illustrating the control states in the second embodiment.

The fuel injection apparatus of the second embodiment monitors the fuel pressure within in-cylinder injector 13, and, when the fuel pressure obtained by monitoring is not less than a reference pressure P1, it externally relieves the fuel within in-cylinder injection delivery pipe 12 to which in-cylinder injectors 13 are attached. The specific control procedure and control states for relieving the fuel will now be described with reference to FIGS. 3 and 4. In the configuration of FIG. 1, low-pressure fuel pump 6, high-pressure fuel pump 10, relief path 24, and electromagnetic relief valve 25 correspond to the relief means.

When control of the fuel injection apparatus by ECU 30 is initiated, it is determined in S11 whether it is the 100% port injection state. The determination is made in the same manner as in S1 in FIG. 2 explained above.

If YES in S11, the process goes to S12. In S12, it is determined whether a fuel pressure in direct injection delivery pipe is equal to or greater than a reference pressure P1. Here, the fuel pressure in direct injection delivery pipe is the fuel pressure within in-cylinder injection delivery pipe 12. Although it would be most desirable to directly detect the fuel pressure within in-cylinder injector 13, it is no problem to detect the fuel pressure in direct injection delivery pipe, since the fuel is supplied from in-cylinder injection delivery pipe 12 to in-cylinder injector 13, and thus, the fuel pressure in direct injection delivery pipe is equal to the fuel pressure within in-cylinder injector 13. The fuel pressure in direct injection delivery pipe is detected by fuel pressure sensor 23, which corresponds to the pressure monitoring means. It is then determined whether the detected fuel pressure is equal to or greater than reference pressure P1.

If YES in S12, the process goes to S13. In S13, electromagnetic relief valve 25 is actuated and opened. Then, in S14, high-pressure fuel pump 10 is actuated. That is, as shown in FIG. 4, at time t1 when it is determined that the fuel pressure is equal to or greater than reference pressure P1, electromagnetic relief valve 25 is opened and high-pressure fuel pump 10 is actuated as well.

Thus, by opening electromagnetic relief valve 25, the fuel within in-cylinder injection delivery pipe 12 can be relieved to fuel tank 5, and also the high-pressure fuel is supplied from high-pressure fuel pump 10, enabling circulation of the fuel through high-pressure fuel supply system 4. With this fuel circulation, the fuel temperature in direct injection delivery pipe as well as the fuel temperature within in-cylinder injector 13 can be lowered (see the graph of the fuel temperature in FIG. 4), although the fuel pressure in direct injection delivery pipe and the fuel pressure within in-cylinder injector 13 hardly change (see the graph of the fuel pressure in FIG. 4) since the high-pressure fuel is being supplied.

In S15, it is determined whether a prescribed time period W1 has elapsed since actuation of high-pressure fuel pump 10. This prescribed time period W1 is prestored in the ROM within ECU 30, and high-pressure fuel pump 10 is actuated during this time period. That is, since the flow rate per unit time of the fuel that is circulated when high-pressure fuel pump 10 is actuated is known in advance, correlation between the duration of the fuel circulation and the lowered value of the fuel temperature, showing how much the fuel temperature is lowered corresponding to how long the fuel is circulated, can be obtained in advance, and this correlation is used to determine prescribed time period W1. If it is determined in S15 that prescribed time period W1 has elapsed, the process goes to S16.

In S16, high-pressure fuel pump 10 is stopped. Stopping high-pressure fuel pump 10 means that electromagnetic spill valve 19 of high-pressure fuel pump 10 is set to a constantly open state. In this state, although the fuel within pressurizing chamber 16 of high-pressure fuel pump 10 is only slightly pressurized as described above, the fuel within in-cylinder injection delivery pipe 12 can be relieved to fuel tank 5, since electromagnetic relief valve 25 is open. Thus, the fuel slightly pressurized in pressurizing chamber 16 is supplied to in-cylinder injection delivery pipe 12, and thus, the low-pressure fuel is circulated through high-pressure fuel supply system 4. This lowers the fuel pressure in direct injection delivery pipe. The fuel temperature in direct injection delivery pipe is lowered as well, by virtue of circulation of the fuel.

More specifically, as shown in FIG. 4, during prescribed time period W1 from time t1 to time t2 in which high-pressure fuel pump 10 is actuated and electromagnetic relief valve 25 is open, the fuel temperature is decreased from temperature T1 to temperatures T2, although the fuel pressure hardly decreases. Thereafter, during the time period in which high-pressure fuel pump 10 is stopped and electromagnetic relief valve 25 is open, the fuel pressure is decreased and the fuel temperature is also decreased. The pace of decrease of the fuel temperature during prescribed time period W1 in which the high-pressure fuel is being circulated is greater than the pace of decrease of the fuel temperature during the time period (from t2 to t3) in which the low-pressure fuel is being circulated. This is because the flow rate of the fuel is greater in the case where the high-pressure fuel is circulated than in the case where the low-pressure fuel is circulated.

In S17, it is determined whether the fuel pressure in direct injection delivery pipe has become a critical fuel pressure Pmin for fuel injection in minimum injection quantity. Here, the critical fuel pressure Pmin for fuel injection in minimum injection quantity refers to the fuel pressure with which fuel injection from in-cylinder injector 13 with the minimum injection quantity is possible. When the fuel pressure in direct injection delivery pipe becomes critical fuel pressure Pmin for fuel injection in minimum injection quantity, the process goes to S18. In S18, electromagnetic relief valve 25 is closed to stop circulation of the fuel. That is, as shown in FIG. 4, at time t3 when the fuel pressure in direct injection delivery pipe has become critical fuel pressure Pmin for fuel injection in minimum injection quantity, electromagnetic relief valve 25 is closed. During the time period (from t2 to t3) in which high-pressure fuel pump 10 is stopped and electromagnetic relief valve 25 is open, the fuel pressure decreases from reference pressure P1 to critical fuel pressure Pmin for fuel injection in minimum injection quantity, and the fuel temperature decreases from temperature T2 to temperature T3.

If the determination in S12 is NO, the process returns to S1. That is, even in the 100% port injection state, if the fuel pressure within in-cylinder injection delivery pipe 12 is less than reference pressure P1, relief of the fuel within in-cylinder injection delivery pipe 12, i.e., circulation of the fuel through high-pressure fuel supply system 4, is not conducted.

In the present embodiment, when the fuel pressure within in-cylinder injector 13 becomes equal to or greater than reference pressure P1, the fuel within in-cylinder injection delivery pipe 12 to which in-cylinder injector 13 is attached is relieved to fuel tank 5. Such relief of the fuel can decrease the pressure of the fuel supplied to in-cylinder injector 13. When the fuel pressure becomes critical fuel pressure Pmin for fuel injection in minimum injection quantity of in-cylinder injector 13, relief of the fuel is stopped. Thus, by ensuring critical fuel pressure Pmin for fuel injection in minimum injection quantity, the fuel injection with the minimum injection quantity is readily carried out.

Further, in the present embodiment, when the fuel pressure within in-cylinder injector 13 becomes equal to or greater than reference pressure P1, the fuel within in-cylinder injection delivery pipe 12 to which in-cylinder injector 13 is attached is relieved to fuel tank 5, and in addition, the high-pressure fuel from high-pressure fuel pump 10 is supplied to in-cylinder injection delivery pipe 12 during prescribed time period W1. This results in circulation of the high-pressure fuel, and accordingly, the temperature increase of the fuel being supplied to in-cylinder injector 13 is suppressed, and at the same time, the fuel itself can cool in-cylinder injector 13, especially the part near the injection hole. As a result, expansion in the vicinity of the injection hole of in-cylinder injector 13 is suppressed, and thus, the quantity of the fuel injected into the combustion chamber of the internal combustion engine can be controlled accurately, thereby ensuring a good combustion state and favorable exhaust emission. After a lapse of prescribed time period W1, the low-pressure fuel from low-pressure fuel pump 6 is circulated until the fuel pressure becomes critical fuel pressure Pmin for fuel injection in minimum injection quantity. In this manner, by making the high-pressure fuel initially circulated, cooling of in-cylinder injector 13 can be accelerated, compared to the case where the low-pressure fuel is circulated.

As described above, according to the fuel injection apparatus of the second embodiment, the following effects can be obtained.

(1) In the present embodiment, when the fuel pressure within in-cylinder injector 13 becomes equal to or greater than reference pressure P1, the fuel within in-cylinder injection delivery pipe 12 is relieved to fuel tank 5 until the fuel pressure becomes critical fuel pressure Pmin for fuel injection in minimum injection quantity of in-cylinder injector 13. Thus, by ensuring critical fuel pressure Pmin for fuel injection in minimum injection quantity, the fuel injection from in-cylinder injector 13 with the minimum injection quantity is readily carried out.

(2) In the present embodiment, the fuel within in-cylinder injection delivery pipe 12 is relieved to fuel tank 5, and in addition, the high-pressure fuel is circulated firstly. As such, compared to the case where the low-pressure fuel is circulated, cooling of in-cylinder injector 13 is accelerated. As a result, expansion in the vicinity of the injection hole of in-cylinder injector 13 is suppressed, and thus, the quantity of the fuel injected into the combustion chamber of the internal combustion engine can be controlled accurately. Accordingly, a good combustion state and favorable exhaust emission are maintained.

It is noted that the second embodiment may be modified as follows:

It may be configured such that, when the fuel pressure within in-cylinder injector 13 becomes equal to or greater than reference pressure P1, the fuel in in-cylinder injection delivery pipe 12 to which in-cylinder injector 13 is attached is relieved to fuel tank 5, and the low-pressure fuel from low-pressure fuel pump 6 is supplied to in-cylinder injection delivery pipe 12 without actuating high-pressure fuel pump 10. In this case, the low-pressure fuel is circulated, making it possible to quickly lower the fuel pressure within in-cylinder injector 13 to critical fuel pressure Pmin for fuel injection in minimum injection quantity.

Third Embodiment

Figure 5:
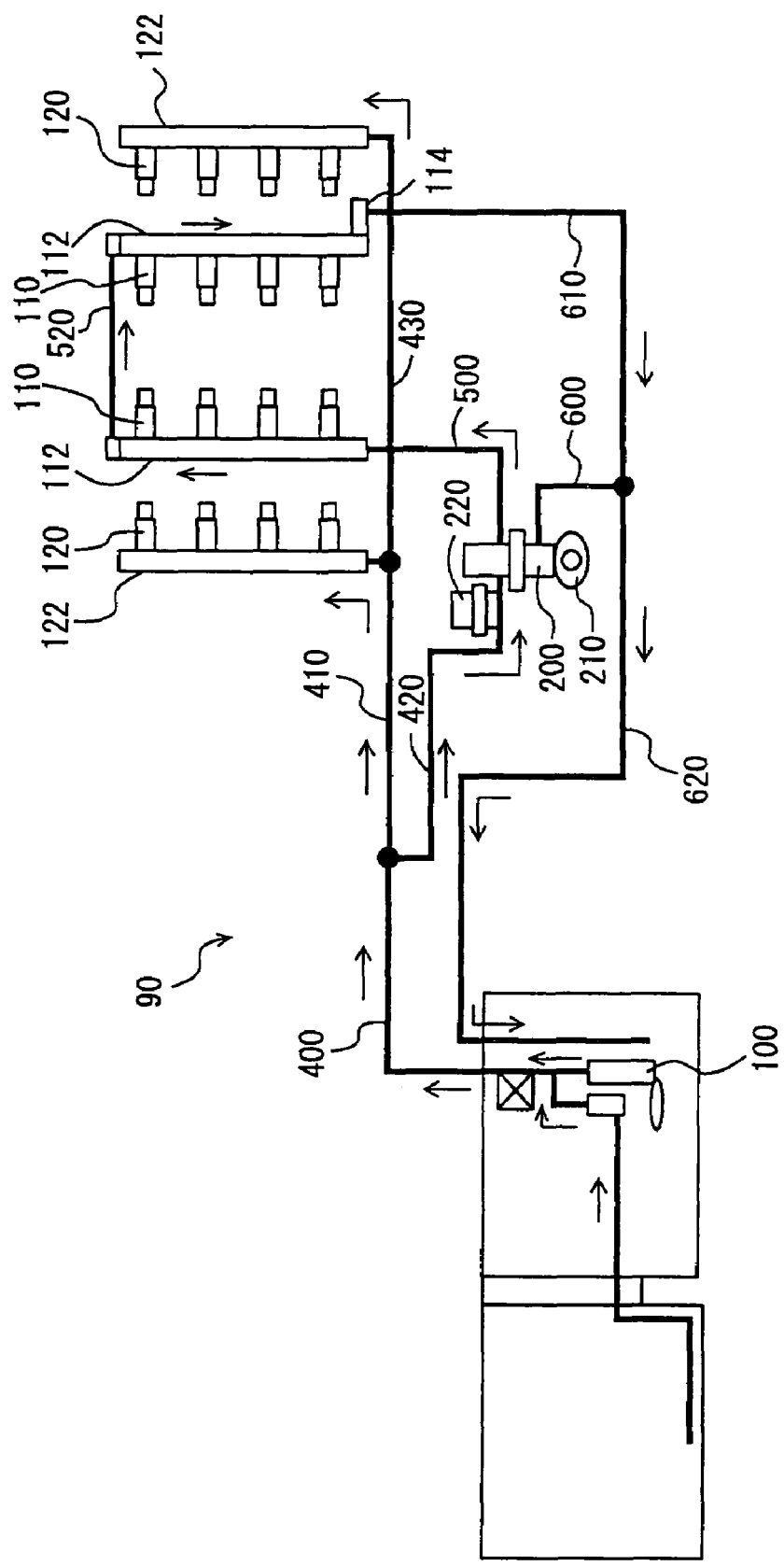
FIG. 5 is an overall view of a fuel supply system of a gasoline engine controlled by a control device according to a third embodiment of the present invention.

The third embodiment of the present invention will now be described. FIG. 5 shows a fuel supply system 90 of an engine controlled by an engine ECU that is a control device according to the present embodiment. The engine is a V-type 8-cylinder gasoline engine, and has in-cylinder injectors 110 for injecting fuel into the respective cylinders, and intake manifold injectors 120 for injecting fuel into intake manifolds of the respective cylinders. It is noted that the present invention is not applied exclusively to such an engine, but is also applicable to a gasoline engine of another type as well as a common rail diesel engine. Further, the number of high-pressure fuel pumps is not restricted to one, but may be two or more.

As shown in FIG. 5, this fuel supply system 90 includes a feed pump 100 provided in a fuel tank and for supplying fuel at a discharge pressure of low pressure (about 400 kPa corresponding to the pressure of a pressure regulator), a high-pressure fuel pump 200 driven by a cam 210, a high-pressure delivery pipe 112 provided for each of left and right banks and for supplying a high-pressure fuel to in-cylinder injectors 110, four in-cylinder injectors 110 for each of the left and right banks, provided at the corresponding high-pressure delivery pipe 112, a low-pressure delivery pipe 122 provided for each of the left and right banks and for supplying fuel to intake manifold injectors 120, and four intake manifold injectors 120 for each of the left and right banks, provided at the corresponding low-pressure delivery pipe 122.

The discharge port of feed pump 100 in the fuel tank is connected to a low-pressure supply pipe 400, which is branched into a first low-pressure delivery connection pipe 410 and a pump supply pipe 420. First low-pressure delivery connection pipe 410 is branched to low-pressure delivery pipe 122 of one of the V-shaped banks, and on the downstream of that branch point, it forms a second low-pressure delivery connection pipe 430, which is connected to low-pressure delivery pipe 122 of the other bank.

Pump supply pipe 420 is connected to the intake port of high-pressure fuel pump 200. A pulsation damper 220 is provided immediately upstream of the intake port of high-pressure fuel pump 200, so as to reduce fuel pulsation.

The discharge port of high-pressure fuel pump 200 is connected to a high-pressure delivery connection pipe 500, which is connected to high-pressure delivery pipe 112 of one of the V-shaped banks. High-pressure delivery pipe 112 of one bank and high-pressure delivery pipe 112 of the other bank are connected via a high-pressure connection pipe 520.

A relief valve 114 provided at high-pressure delivery pipe 112 is connected to a high-pressure delivery return pipe 610, which is connected to a high-pressure fuel pump return pipe 600. The return port of high-pressure fuel pump 200 is connected to high-pressure fuel pump return pipe 600. High-pressure fuel pump return pipe 600 is connected to a return pipe 620, which is then connected to the fuel tank.

Figure 6:
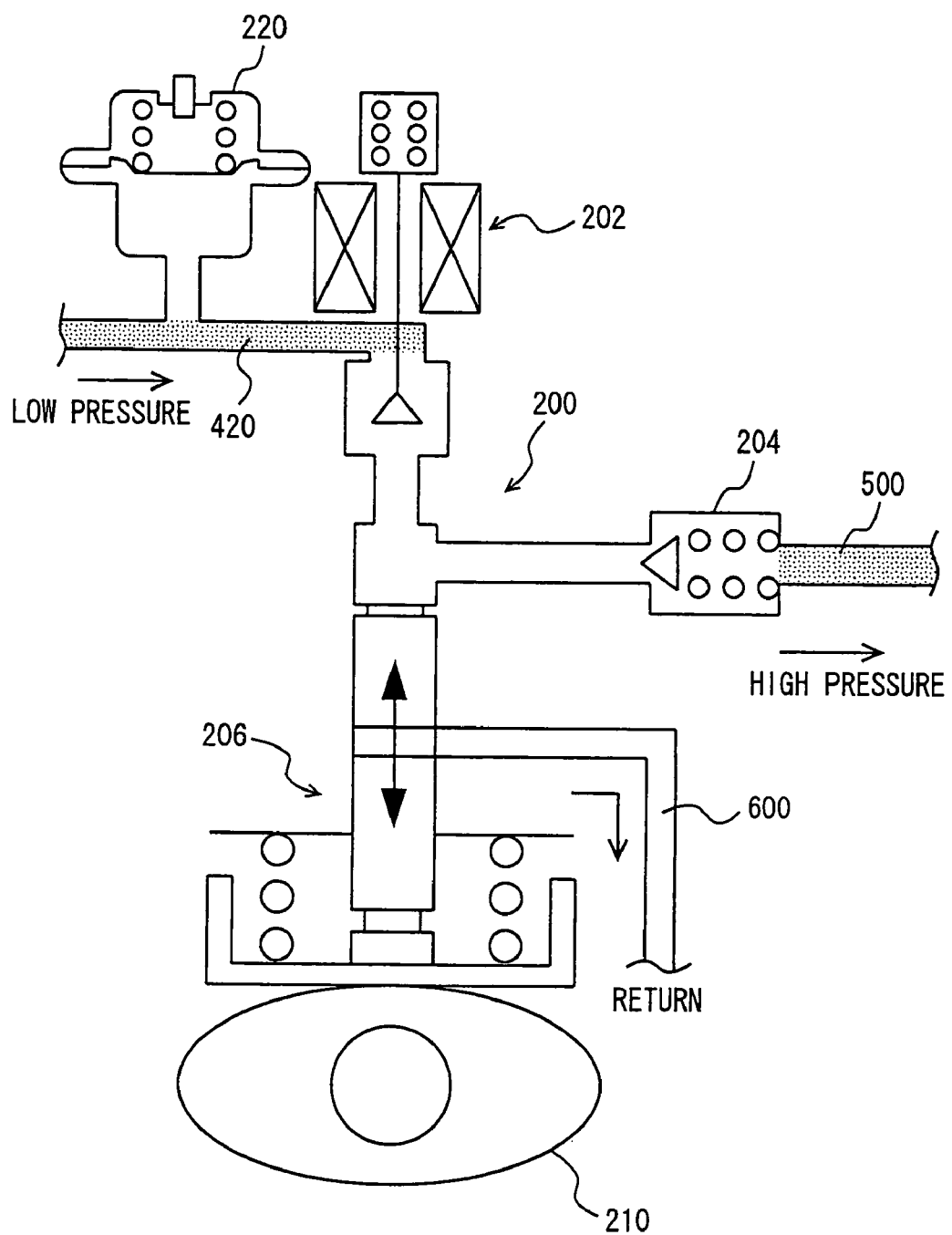
FIG. 6 is a partial enlarged view of FIG. 5.

FIG. 6 is an enlarged view of high-pressure fuel pump 200 and its surroundings in FIG. 5. High-pressure fuel pump 200 has, as its main components, a pump plunger 206 driven by a cam 210 to slide up and down, an electromagnetic spill valve 202, and a check valve 204 provided with a leakage function.

When pump plunger 206 is moved downward by cam 210 and while electromagnetic spill valve 202 is open, the fuel is introduced (suctioned). When pump plunger 206 is moved upward by cam 210, the timing to close electromagnetic spill valve 202 is changed to control the quantity of the fuel discharged from high-pressure fuel pump 200. During the pressurizing stroke in which pump plunger 206 is moved upward, the fuel of a greater quantity is discharged as the timing to close electromagnetic spill valve 202 is earlier, whereas the fuel of a fewer quantity is discharged as the timing to close the valve is later. The drive duty of electromagnetic spill valve 202 when the greatest quantity of fuel is discharged is set to 100%, and the drive duty of electromagnetic spill valve 202 when the smallest quantity of fuel is discharged is set to 0%. When the drive duty is 0%, electromagnetic spill valve 202 remains open, in which case, although pump plunger 206 slides up and down as long as cam 210 continues to rotate (along with revolution of the engine), the fuel is not pressurized because electromagnetic spill valve 202 does not close.

The pressurized fuel presses and opens check valve 204 provided with the leakage function (of the set pressure of about 60 kPa), and the fuel is supplied via high-pressure delivery connection pipe 500 to high-pressure delivery pipe 112. At this time, the fuel pressure is controlled in a feedback manner by a fuel pressure sensor provided at high-pressure delivery pipe 112. High-pressure delivery pipes 112 at the respective banks are connected via high-pressure connection pipe 520, as described above.

Check valve 204 with the leakage function is a check valve of a normal type but provided with pores that are always open. When the fuel pressure within high-pressure fuel pump 200 (pump plunger 206) becomes lower than the fuel pressure within high-pressure delivery connection pipe 500 (for example, when the engine and hence cam 210 stops while electromagnetic spill valve 202 remains open), the high-pressure fuel within high-pressure delivery connection pipe 500 returns through the pores back to the high-pressure fuel pump 200 side, thereby lowering the fuel pressure within high-pressure delivery connection pipe 500 as well as within high-pressure delivery pipe 112. As such, at the time of stop of the engine, for example, the fuel within high-pressure delivery pipe 112 is not at a high pressure, so that leakage of the fuel from in-cylinder injectors 110 is prevented.

Figure 7:
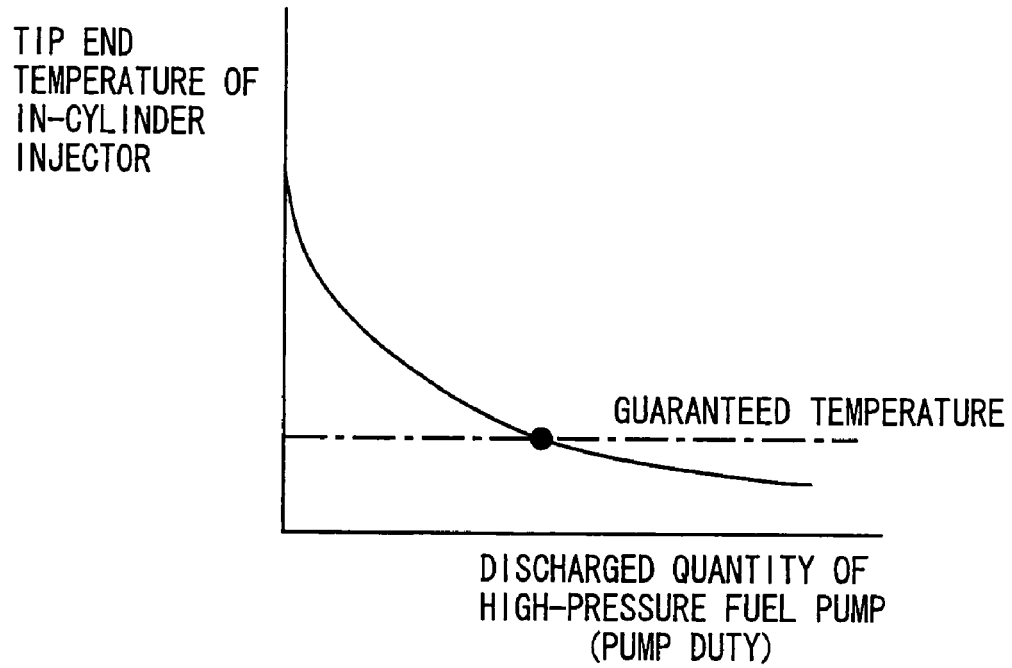
FIG. 7 shows the relation between the quantity of fuel discharged from a high-pressure fuel pump and the temperature at the tip end of an in-cylinder injector.

FIG. 7 shows a map illustrating the relation between the quantity of the fuel discharged from high-pressure fuel pump 200 (that is controlled by the drive duty of the pump) and the temperature at the tip end of in-cylinder injector 110. As shown in FIG. 7, as the quantity of the fuel discharged from the high-pressure fuel pump is greater, in-cylinder injector 110 is cooled to a greater extent, as the fuel of the greater quantity absorbs more heat of in-cylinder injector 110. This lowers the temperature at the tip end of in-cylinder injector 110. A guaranteed temperature shown in FIG. 7 is an upper limit of the temperature with which no deposit is produced in the injection hole at the tip end of in-cylinder injector 110. It is noted that such relation between the quantity of the fuel discharged from high-pressure fuel pump 200 and the temperature at the tip end of in-cylinder injector 110 may be indicated using the temperature of the engine (e.g., the temperature of the engine coolant) as a parameter. That is, a plurality of maps as shown in FIG. 7 may be set for different engine coolant temperatures. It is also noted that the map shown in FIG. 7 is merely an example, and the present invention is not restricted thereto.

Figure 8:
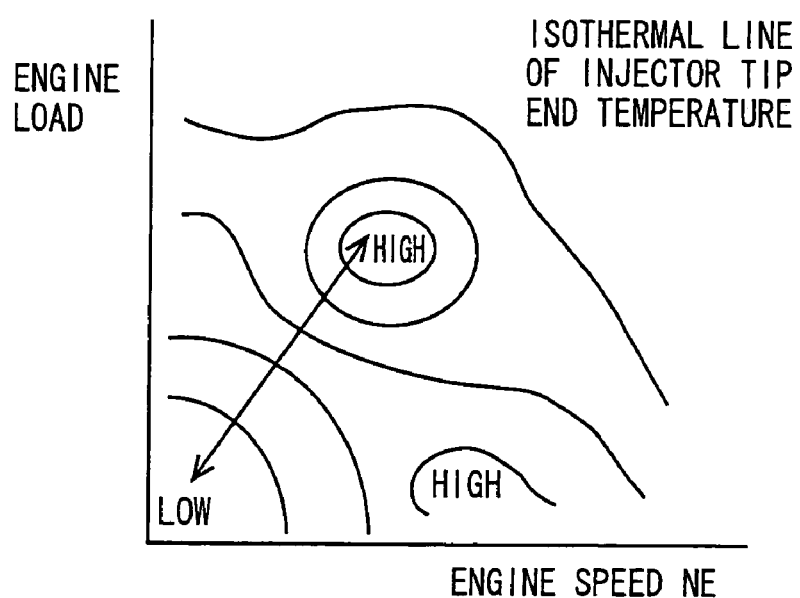
FIG. 8 is an isothermal chart of the tip end temperature of the in-cylinder injector with engine speed and engine load used as parameters.

FIG. 8 is an isothermal chart of the temperature at the tip end of in-cylinder injector 110 using the engine speed and the engine load as parameters. Generally, the temperature at the tip end of in-cylinder injector 110 is higher in the region with higher engine speed than lower engine speed, and in the region with greater engine load than smaller engine load. It however should be noted that the temperature is highest in the region where the engine speed and the engine load are both at an intermediate level, rather than the highest level, as shown in FIG. 8. Further, there is also a region where, even with low load, the temperature is high at a specific engine speed. Each engine has a unique isothermal chart. Further, the isothermal chart of the temperature at the tip end of in-cylinder injector 110 may use the engine temperature (e.g., the engine coolant temperature) as another parameter, in addition to the engine speed and engine load. That is, a plurality of maps as shown in FIG. 8 may be prepared for different engine coolant temperatures. The isothermal chart shown in FIG. 8 is merely an example, and the present invention is not restricted thereto.

Figure 9:
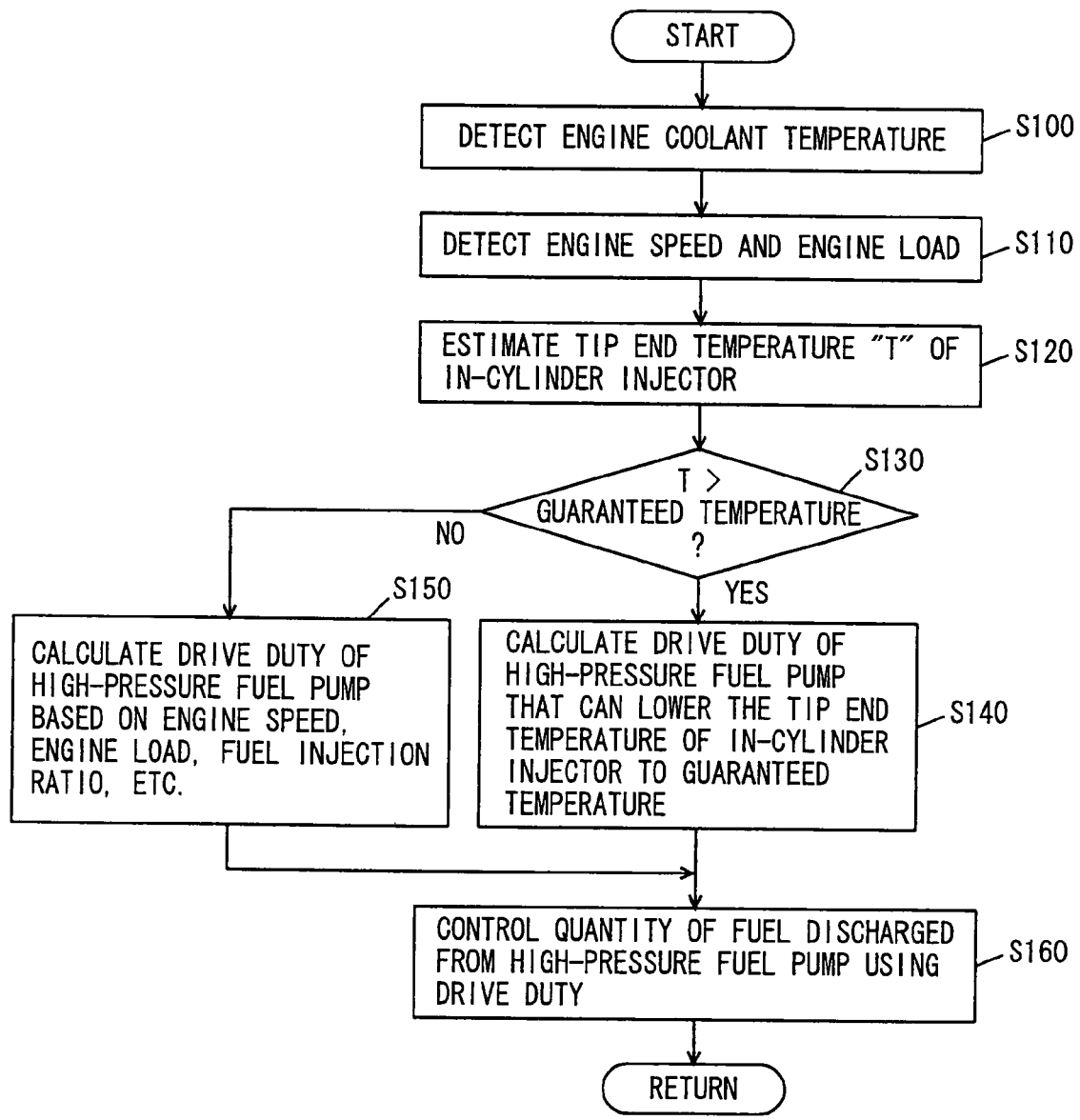
FIG. 9 is a flowchart illustrating a control structure of a program executed by an engine ECU implementing the control device of the third embodiment.

A control structure of a program executed by the engine ECU implementing the control device of the present embodiment will now be described with reference to FIG. 9.

In S100, the engine ECU detects the engine coolant temperature. In S110, the engine ECU detects the engine speed and the engine load. In S120, the engine ECU estimates the temperature T at the tip end of in-cylinder injector 110, using the isothermal chart as shown in FIG. 8. At this time, temperature T at the tip end of in-cylinder injector 110 may be estimated based on a combination of any two of the engine coolant temperature, the engine speed and the engine load, or based on a combination of all three of them.

In S130, the engine ECU determines whether temperature T at the tip end of in-cylinder injector 110 is greater than a guaranteed temperature, which is, e.g., the one shown in FIG. 7. If temperature T at the tip end of in-cylinder injector 110 is greater than the guaranteed temperature (YES in S130), the process goes to S140. If not (NO in S130), the process goes to S150.

In S140, the engine ECU calculates the drive duty corresponding to the quantity of the fuel discharged from high-pressure fuel pump 200 that can lower the temperature at the tip end of in-cylinder injector 110 to the guaranteed temperature. The map as shown in FIG. 7 is used at this time.

In S150, the engine ECU calculates the drive duty corresponding to the quantity of the fuel discharged from high-pressure fuel pump 200 based on the engine speed, the engine load, and a fuel injection ratio (between in-cylinder injector 110 and intake manifold injector 120).

In S160, the engine ECU controls the quantity of the fuel discharged from high-pressure fuel pump 200 using the drive duty calculated in S140 or S150.

An operation of the high-pressure fuel system controlled by the engine ECU implementing the control device of the present embodiment based on the above-described structure and flowchart will now be described. In the following description, the state of the fuel injection of in-cylinder injector 110 may be the state where the quantity of the fuel being injected is reduced, or may be the state where the fuel injection therefrom is stopped.

While the engine is operating, the temperature of the engine coolant is detected (S100), and the engine speed and the engine load are detected (S110). From the map as shown in FIG. 8 using the engine coolant temperature, the engine speed and the engine load as parameters, temperature T at the tip end of in-cylinder injector 110 is estimated (S120).

When temperature T at the tip end of in-cylinder injector 110 is higher than the guaranteed temperature (YES in S130), the drive duty of high-pressure fuel pump 200 is calculated such that the quantity of the fuel injected therefrom ensures that the temperature at the tip end of in-cylinder injector 110 is lowered to the guaranteed temperature (S140). The drive duty is used to control the timing to close electromagnetic spill valve 202 (S160). Since the fuel of a greater quantity is discharged as the timing to close electromagnetic spill valve 202 is earlier, the drive duty is increased when increasing the discharge quantity. As a result, high-pressure fuel pump 200 discharges the fuel of a larger quantity.

The fuel discharged from high-pressure fuel pump 200 is supplied via high-pressure delivery connection pipe 500 to high-pressure delivery pipe 112, and cools in-cylinder injectors 110 of the corresponding bank. Thereafter, the fuel is distributed through high-pressure connection pipe 520 to high-pressure delivery pipe 112 of the other bank, thereby cooling in-cylinder injectors 110 of the relevant bank. The fuel is then returned to the fuel tank via relief valve 114, provided at the end of high-pressure delivery pipe 112, and through high-pressure delivery return pipe 610 and return pipe 620.

As described above, according to the control device of the present embodiment, the quantity of the fuel discharged from the high-pressure fuel pump is controlled such that the temperature at the tip end of the in-cylinder injector is not greater than the guaranteed temperature suppressing production of deposits. For example, even in the case where the fuel injection quantity from the in-cylinder injector is reduced or set to zero, the quantity of the fuel discharged from the high-pressure fuel pump is determined so as to have heat capacity that ensures reduction of the estimated temperature at the tip end of the in-cylinder injector. As a result, the in-cylinder injector is cooled by the fuel, and the temperature at the tip end of the in-cylinder injector is reduced to suppress formation of deposits.

(Modification)

Hereinafter, a control device according to a modification of the present invention will be described. The control device according to the present modification executes a program different from that of the above-described embodiment. The other hardware configuration (FIGS. 5 and 6) is common, and thus, detailed description thereof will not be repeated.

The present modification relates to control of high-pressure fuel pump 200 restricted to the case where the fuel injection quantity from in-cylinder injector 110 is zero (i.e., in-cylinder injector 110 is stopped). Even in the case where the fuel injection quantity from in-cylinder injector 110 is zero, high-pressure fuel pump 200 is controlled such that it discharges the whole quantity of the fuel. In doing so, the fuel of the maximum discharge quantity of high-pressure fuel pump 200 is circulated through the high-pressure fuel system, and in-cylinder injector 110 can be cooled with the large quantity of fuel, in which case production of deposits in the injection hole at the tip end of in-cylinder injector 110 can be avoided to the greatest extent.

Alternatively, again in the case where the fuel injection quantity from in-cylinder injector 110 is zero, high-pressure fuel pump 200 may be controlled such that it discharges the fuel in the quantity with which the temperature at the tip end of the in-cylinder injector does not exceed the guaranteed temperature. In doing so, the fuel of the quantity less than the maximum discharge quantity of the high-pressure fuel pump is circulated through the high-pressure fuel system. Thus, in-cylinder injector 110 can be cooled with the fuel, while reducing the loss (friction loss) in the high-pressure fuel pump, and accordingly, production of deposits in the injection hole at the tip end of in-cylinder injector 110 can be avoided.

(Engine (1) to Which Present Control Device is Suitably Adapted)

An engine (1) to which the control device of the present invention is suitably adapted will now be described.

Figure 10:
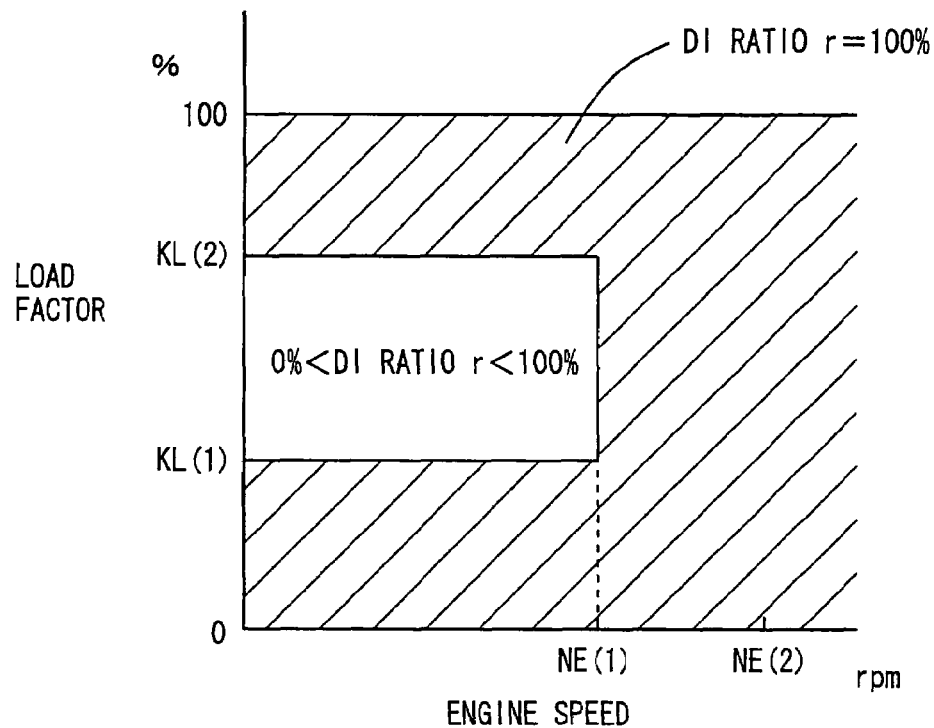
FIGS. 10-13 are DI ratio maps of an engine to which a control device according to an embodiment of the present invention is adapted.
Figure 11:
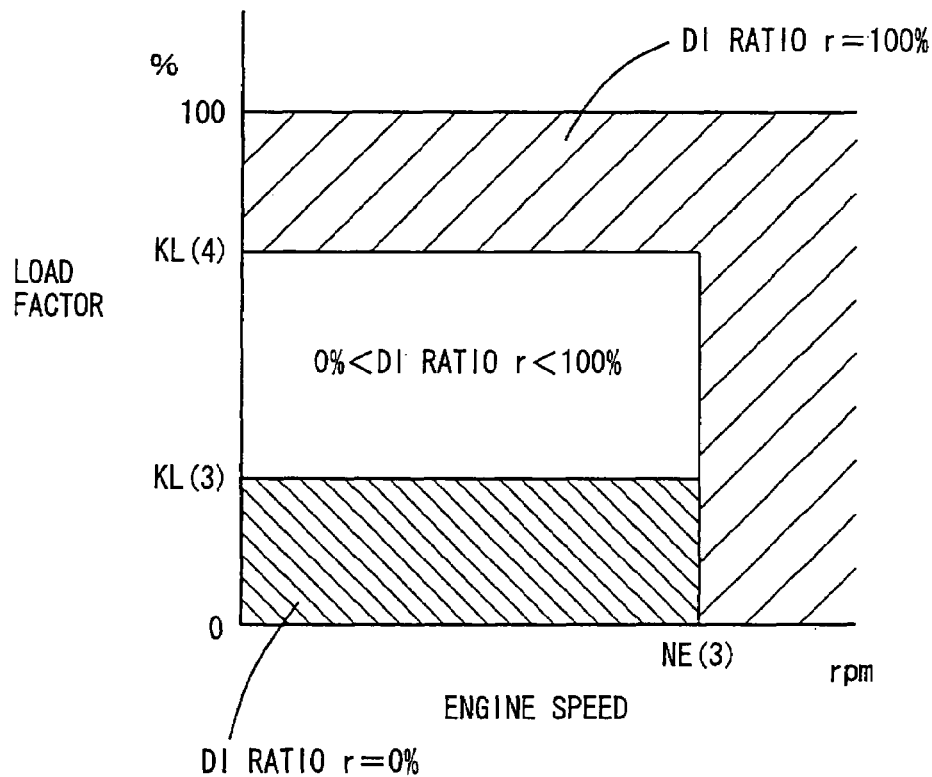

Referring to FIGS. 10 and 11, maps each indicating a fuel injection ratio between in-cylinder injector 110 and intake manifold injector 120, identified as information associated with an operation state of the engine, will now be described. Herein, the fuel injection ratio between the two injectors is also expressed as a ratio of the quantity of the fuel injected from in-cylinder injector 110 to the total quantity of the fuel injected, which is referred to as the "fuel injection ratio of in-cylinder injector 110", or a "DI (Direct Injection) ratio (r)". The maps are stored in the ROM of the engine ECU. FIG. 10 is the map for a warm state of the engine, and FIG. 11 is the map for a cold state of the engine.

In the maps illustrated in FIGS. 10 and 11, with the horizontal axis representing an engine speed of the engine and the vertical axis representing a load factor, the fuel injection ratio of in-cylinder injector 110, or the DI ratio r, is expressed in percentage.

As shown in FIGS. 10 and 11, the DI ratio r is set for each operation region that is determine by the engine speed and the load factor of the engine. "DI RATIO r=100%" represents the region where fuel injection is carried out using only in-cylinder injector 110, and "DI RATIO r=0%" represents the region where fuel injection is carried out using only intake manifold injector 120. "DI RATIO r≠0%", "DI RATIO r≠100%" and "0%<DI RATIO r<100%" each represent the region where fuel injection is carried out using both in-cylinder injector 110 and intake manifold injector 120. Generally, in-cylinder injector 110 contributes to an increase of output performance, while intake manifold injector 120 contributes to uniformity of the air-fuel mixture. These two kinds of injectors having different characteristics are appropriately selected depending on the engine speed and the load factor of the engine, so that only homogeneous combustion is conducted in the normal operation state of the engine (other than the abnormal operation state such as a catalyst warm-up state during idling).

Further, as shown in FIGS. 10 and 11, the fuel injection ratio between in-cylinder injector 110 and intake manifold injector 120, or, the DI ratio r, is defined individually in the map for the warm state and in the map for the cold state of the engine. The maps are configured to indicate different control regions of in-cylinder injector 110 and intake manifold injector 120 as the temperature of the engine changes. When the temperature of the engine detected is equal to or higher than a predetermined temperature threshold value, the map for the warm state shown in FIG. 10 is selected; otherwise, the map for the cold state shown in FIG. 11 is selected. One or both of in-cylinder injector 110 and intake manifold injector 120 are controlled based on the selected map and according to the engine speed and the load factor of the engine.

The engine speed and the load factor of the engine set in FIGS. 10 and 11 will now be described. In FIG. 10, NE(1) is set to 2500 rpm to 2700 rpm, KL(1) is set to 30% to 50%, and KL(2) is set to 60% to 90%. In FIG. 11, NE(3) is set to 2900 rpm to 3100 rpm. That is, NE(1)<NE(3). NE(2) in FIG. 10 as well as KL(3) and KL(4) in FIG. 11 are also set as appropriate.

When comparing FIG. 10 and FIG. 11, NE(3) of the map for the cold state shown in FIG. 11 is greater than NE(1) of the map for the warm state shown in FIG. 10. This shows that, as the temperature of the engine is lower, the control region of intake manifold injector 120 is expanded to include the region of higher engine speed. That is, in the case where the engine is cold, deposits are unlikely to accumulate in the injection hole of in-cylinder injector 110 (even if the fuel is not injected from in-cylinder injector 110). Thus, the region where the fuel injection is to be carried out using intake manifold injector 120 can be expanded, to thereby improve homogeneity.

When comparing FIG. 10 and FIG. 11, "DI RATIO r=100%" in the region where the engine speed of the engine is NE(1) or higher in the map for the warm state, and in the region where the engine speed is NE(3) or higher in the map for the cold state. In terms of load factor, "DI RATIO r=100%" in the region where the load factor is KL(2) or greater in the map for the warm state, and in the region where the load factor is KL(4) or greater in the map for the cold state. This means that in-cylinder injector 110 solely is used in the region of a predetermined high engine speed, and in the region of a predetermined high engine load. That is, in the high speed region or the high load region, even if fuel injection is carried out using only in-cylinder injector 110, the engine speed and the load of the engine are high, ensuring a sufficient intake air quantity, so that it is readily possible to obtain a homogeneous air-fuel mixture even using only in-cylinder injector 110. In this manner, the fuel injected from in-cylinder injector 110 is atomized within the combustion chamber involving latent heat of vaporization (or, absorbing heat from the combustion chamber). Thus, the temperature of the air-fuel mixture is decreased at the compression end, whereby antiknock performance is improved. Further, since the temperature within the combustion chamber is decreased, intake efficiency improves, leading to high power output.

In the map for the warm state in FIG. 10, fuel injection is also carried out using only in-cylinder injector 110 when the load factor is KL(1) or less. This shows that in-cylinder injector 110 alone is used in a predetermined low load region when the temperature of the engine is high. When the engine is in the warm state, deposits are likely to accumulate in the injection hole of in-cylinder injector 110. However, when fuel injection is carried out using in-cylinder injector 110, the temperature of the injection hole can be lowered, whereby accumulation of deposits is prevented. Further, clogging of in-cylinder injector 110 may be prevented while ensuring the minimum fuel injection quantity thereof. Thus, in-cylinder injector 110 alone is used in the relevant region.

When comparing FIG. 10 and FIG. 11, there is a region of "DI RATIO r=0%" only in the map for the cold state in FIG. 11. This shows that fuel injection is carried out using only intake manifold injector 120 in a predetermined low load region (KL(3) or less) when the temperature of the engine is low. When the engine is cold and low in load and the intake air quantity is small, atomization of the fuel is unlikely to occur. In such a region, it is difficult to ensure favorable combustion with the fuel injection from in-cylinder injector 110. Further, particularly in the low-load and low-speed region, high output using in-cylinder injector 110 is unnecessary. Accordingly, fuel injection is carried out using only intake manifold injector 120, rather than in-cylinder injector 110, in the relevant region.

Further, in an operation other than the normal operation, or, in the catalyst warm-up state during idling of the engine (abnormal operation state), in-cylinder injector 110 is controlled to carry out stratified charge combustion. By causing the stratified charge combustion during the catalyst warm-up operation, warming up of the catalyst is promoted, and exhaust emission is thus improved.

(Engine (2) to Which Present Control Device is Suitably Adapted)

Hereinafter, an engine (2) to which the control device of the present invention is suitably adapted will be described. In the following description of the engine (2), the configurations similar to those of the engine (1) will not be repeated.

Figure 12:
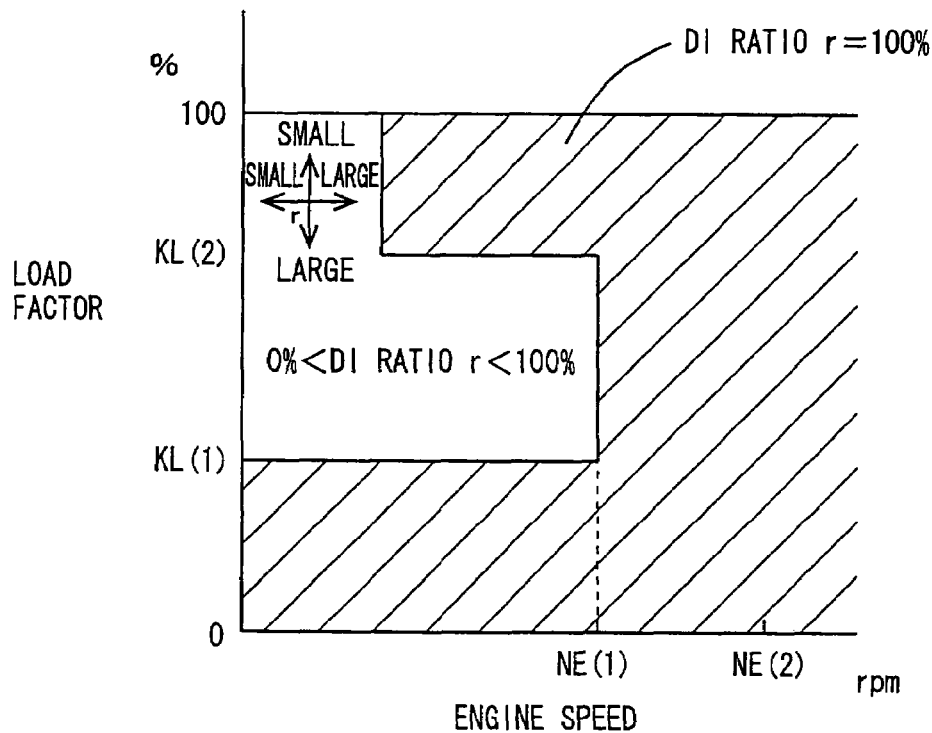
Figure 13:
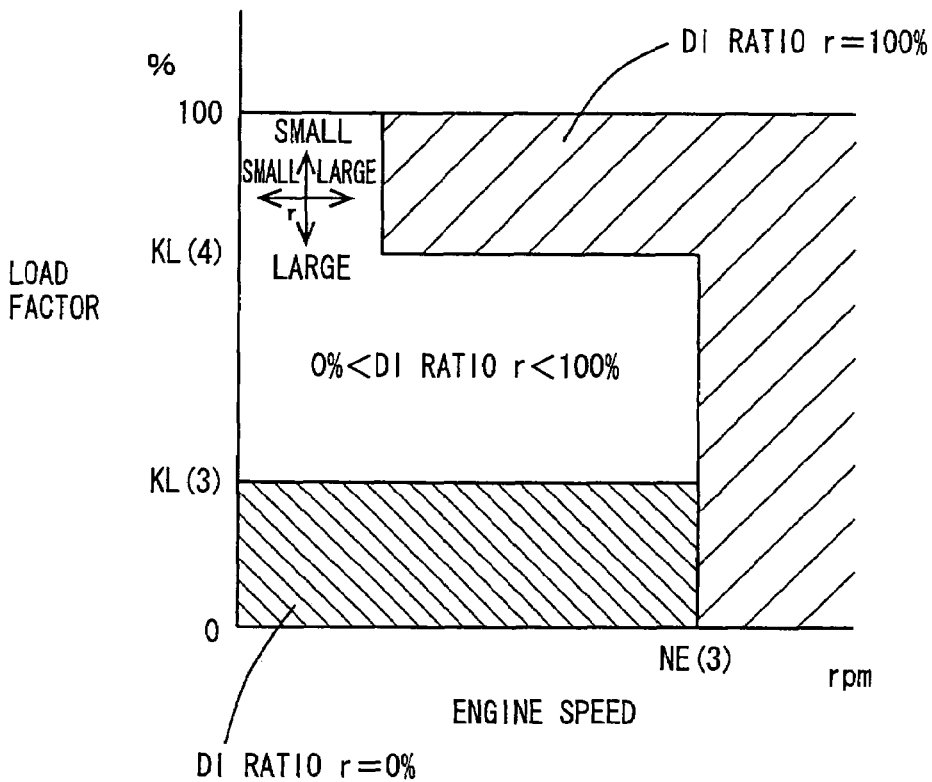

Referring to FIGS. 12 and 13, maps each indicating the fuel injection ratio between in-cylinder injector 110 and intake manifold injector 120, identified as information associated with the operation state of the engine, will be described. The maps are stored in the ROM of the engine ECU. FIG. 12 is the map for the warm state of the engine, and FIG. 13 is the map for the cold state of the engine.

FIGS. 12 and 13 differ from FIGS. 10 and 11 in the following points. "DI RATIO r=100%" holds in the region where the engine speed of the engine is equal to or higher than NE(1) in the map for the warm state, and in the region where the engine speed is NE(3) or higher in the map for the cold state. Further, except for the low-speed region, "DI RATIO r=100%" holds in the region where the load factor is KL(2) or greater in the map for the warm state, and in the region where the load factor is KL(4) or greater in the map for the cold state. This means that fuel injection is carried out using only in-cylinder injector 110 in the region where the engine speed is at a predetermined high level, and that fuel injection is often carried out using only in-cylinder injector 110 in the region where the engine load is at a predetermined high level. However, in the low-speed and high-load region, mixing of an air-fuel mixture formed by the fuel injected from in-cylinder injector 110 is poor, and such inhomogeneous air-fuel mixture within the combustion chamber may lead to unstable combustion. Thus, the fuel injection ratio of in-cylinder injector 110 is increased as the engine speed increases where such a problem is unlikely to occur, whereas the fuel injection ratio of in-cylinder injector 110 is decreased as the engine load increases where such a problem is likely to occur. These changes in the fuel injection ratio of in-cylinder injector 110, or, the DI ratio r, are shown by crisscross arrows in FIGS. 12 and 13. In this manner, variation in output torque of the engine attributable to the unstable combustion can be suppressed. It is noted that these measures are approximately equivalent to the measures to decrease the fuel injection ratio of in-cylinder injector 110 as the state of the engine moves toward the predetermined low speed region, or to increase the fuel injection ratio of in-cylinder injector 110 as the engine state moves toward the predetermined low load region. Further, except for the relevant region (indicated by the crisscross arrows in FIGS. 12 and 13), in the region where fuel injection is carried out using only in-cylinder injector 110 (on the high speed side and on the low load side), a homogeneous air-fuel mixture is readily obtained even when the fuel injection is carried out using only in-cylinder injector 110. In this case, the fuel injected from in-cylinder injector 110 is atomized within the combustion chamber involving latent heat of vaporization (by absorbing heat from the combustion chamber). Accordingly, the temperature of the air-fuel mixture is decreased at the compression side, and thus, the antiknock performance improves. Further, with the temperature of the combustion chamber decreased, intake efficiency improves, leading to high power output.

In the engine explained in conjunction with FIGS. 10-13, homogeneous combustion is achieved by setting the fuel injection timing of in-cylinder injector 110 in the intake stroke, while stratified charge combustion is realized by setting it in the compression stroke. That is, when the fuel injection timing of in-cylinder injector 110 is set in the compression stroke, a rich air-fuel mixture can be located locally around the spark plug, so that a lean air-fuel mixture in the combustion chamber as a whole is ignited to realize the stratified charge combustion. Even if the fuel injection timing of in-cylinder injector 110 is set in the intake stroke, stratified charge combustion can be realized if it is possible to provide a rich air-fuel mixture locally around the spark plug.

As used herein, the stratified charge combustion includes both the stratified charge combustion and semi-stratified charge combustion. In the semi-stratified charge combustion, intake manifold injector 120 injects fuel in the intake stroke to generate a lean and homogeneous air-fuel mixture in the whole combustion chamber, and then in-cylinder injector 110 injects fuel in the compression stroke to generate a rich air-fuel mixture around the spark plug, so as to improve the combustion state. Such semi-stratified charge combustion is preferable in the catalyst warm-up operation for the following reasons. In the catalyst warm-up operation, it is necessary to considerably retard the ignition timing and maintain a favorable combustion state (idling state) so as to cause a high-temperature combustion gas to reach the catalyst. Further, a certain quantity of fuel needs to be supplied. If the stratified charge combustion is employed to satisfy these requirements, the quantity of the fuel will be insufficient. If the homogeneous combustion is employed, the retarded amount for the purpose of maintaining favorable combustion is small compared to the case of stratified charge combustion. For these reasons, the above-described semi-stratified charge combustion is preferably employed in the catalyst warm-up operation, although either of stratified charge combustion and semi-stratified charge combustion may be employed.

Further, in the engine explained in conjunction with FIGS. 10-13, the fuel injection timing of in-cylinder injector 110 is set in the intake stroke in a basic region corresponding to the almost entire region (here, the basic region refers to the region other than the region where semi-stratified charge combustion is carried out with fuel injection from intake manifold injector 120 in the intake stroke and fuel injection from in-cylinder injector 110 in the compression stroke, which is carried out only in the catalyst warm-up state). The fuel injection timing of in-cylinder injector 110, however, may be set temporarily in the compression stroke for the purpose of stabilizing combustion, for the following reasons.

When the fuel injection timing of in-cylinder injector 110 is set in the compression stroke, the air-fuel mixture is cooled by the injected fuel while the temperature in the cylinder is relatively high. This improves the cooling effect and, hence, the antiknock performance. Further, when the fuel injection timing of in-cylinder injector 110 is set in the compression stroke, the time from the fuel injection to the ignition is short, which ensures strong penetration of the injected fuel, so that the combustion rate increases. The improvement in antiknock performance and the increase in combustion rate can prevent variation in combustion, and thus, combustion stability is improved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A fuel supply apparatus for an internal combustion engine having first fuel injection means for injecting fuel into a cylinder, and second fuel injection means for injecting fuel into an intake manifold, a high-pressure fuel system for supplying the fuel to said first fuel injection means including a high-pressure fuel pump, the fuel supply apparatus comprising:

means for controlling the fuel injection means such that fuel injection is carried out using one or both of said first and second fuel injection means based on a condition required for said internal combustion engine; and control means for controlling said high-pressure fuel pump, said control means including means for controlling said high-pressure fuel pump such that the fuel is supplied from said high-pressure fuel pump, even in a region where said first fuel injection means is stopped, through a high-pressure delivery pipe past the first fuel injection means and portions thereof returned through a return pipe connected to a fuel tank to control the temperature of the first fuel injection means to be equal to or less than a predetermined temperature through circulation of the fuel.

2. The fuel supply apparatus for an internal combustion engine according to claim 1, further comprising estimating means for estimating a temperature at a tip end of said first fuel injection means, and said control means includes means for controlling said high-pressure fuel pump based on said temperature at the tip end.

3. The fuel supply apparatus for an internal combustion engine according to claim 2, wherein said control means includes means for controlling a quantity of the fuel discharged from said high-pressure fuel pump such that said temperature at the tip end becomes not higher than the predetermined temperature.

4. The fuel supply apparatus for an internal combustion engine according to claim 2, wherein said estimating means includes means for estimating said temperature at the tip end based on at least one of a temperature of the internal combustion engine, an engine speed of the internal combustion engine, and a load of the internal combustion engine.

5. The fuel supply apparatus for an internal combustion engine according to claim 4, wherein the means for estimating a temperature at the tip end of said first fuel injection means is based on a combination of two or more of engine coolant temperature, engine speed, and engine load.

6. A fuel supply apparatus for an internal combustion engine having first fuel injection means for injecting fuel into a cylinder and second fuel injection means for injecting fuel into an intake manifold, a high-pressure fuel system for supplying the fuel to said first fuel injection means including a high-pressure fuel pump, the fuel supply apparatus comprising:
   means for controlling the fuel injection means such that fuel injection is carried out using one or both of said first and second fuel injection means based on a condition required for said internal combustion engine;
   estimating means for estimating a temperature at a tip end of said first fuel injection means; and
   control means for controlling said high-pressure fuel pump,
   said control means including means for controlling said high-pressure fuel pump such that the fuel is supplied from said high-pressure fuel pump based on said temperature at the tip end even when the quantity of the fuel injected from said first fuel injection means is decreased, the fuel supplied from the high-pressure fuel pump being delivered through a high-pressure delivery pipe past the first fuel injection means and portions thereof returned through a return pipe connected to a fuel tank to control the temperature at the tip end of the first fuel injection means to be equal to or less than a predetermined temperature through circulation of the fuel.

7. The fuel supply apparatus for an internal combustion engine according to claim 6, wherein said control means includes means for controlling said high-pressure fuel pump based on said temperature at the tip end.

8. The fuel supply apparatus for an internal combustion engine according to claim 7, wherein said control means includes means for controlling a quantity of the fuel discharged from said high-pressure fuel pump such that said temperature at the tip end becomes equal to or less than the predetermined temperature.

9. The fuel supply apparatus for an internal combustion engine according to claim 7, wherein said estimating means includes means for estimating said temperature at the tip end based on at least one of a temperature of the internal combustion engine, an engine speed of the internal combustion engine, and a load of the internal combustion engine.

10. The fuel supply apparatus for an internal combustion engine according to claim 6, wherein the means for estimating a temperature at the tip end of said first fuel injection means is based on a combination of two or more of engine coolant temperature, engine speed, and engine load.

11. A fuel supply apparatus for an internal combustion engine having a first fuel injection mechanism for injecting fuel into a cylinder, and a second fuel injection mechanism for injecting fuel into an intake manifold, a high-pressure fuel system for supplying the fuel to said first fuel injection mechanism including a high-pressure fuel pump, the fuel supply apparatus comprising:
   an injection control unit for controlling the fuel injection mechanisms such that fuel injection is carried out using one or both of said first and second fuel injection mechanisms based on a condition required for said internal combustion engine; and
   a control unit for controlling said high-pressure fuel pump, said control unit controlling said high-pressure fuel pump such that the fuel is supplied from said high-pressure fuel pump, even in a region where said first fuel injection mechanism is stopped, through a high-pressure delivery pipe past the first fuel injection mechanism and portions thereof returned through a return pipe connected to a fuel tank to control the temperature of the first fuel injection mechanism to be equal to or less than a predetermined temperature through circulation of the fuel.

12. The fuel supply apparatus for an internal combustion engine according to claim 11, further comprising an estimating unit for estimating a temperature at a tip end of said first fuel injection mechanism, and
   said control unit controls said high-pressure fuel pump based on said temperature at the tip end.

13. The fuel supply apparatus for an internal combustion engine according to claim 12, wherein said control unit controls a quantity of the fuel discharged from said high-pressure fuel pump such that said temperature at the tip end becomes equal to or less than the predetermined temperature.

14. The fuel supply apparatus for an internal combustion engine according to claim 12, wherein said estimating unit estimates said temperature at the tip end based on at least one of a temperature of the internal combustion engine, an engine speed of the internal combustion engine, and a load of the internal combustion engine.

15. The fuel supply apparatus for an internal combustion engine according to claim 14, wherein the estimating unit for estimating a temperature at the tip end of said first fuel injection mechanism is based on a combination of two or more of engine coolant temperature, engine speed, and engine load.

16. A fuel supply apparatus for an internal combustion engine having a first fuel injection mechanism for injecting fuel into a cylinder and a second fuel injection mechanism for injecting fuel into an intake manifold, a high-pressure fuel system for supplying the fuel to said first fuel injection mechanism including a high-pressure fuel pump, the fuel supply apparatus comprising:
   an injection control unit for controlling the fuel injection mechanisms such that fuel injection is carried out using one or both of said first and second fuel injection mechanisms based on a condition required for said internal combustion engine;
   an estimating unit for estimating a temperature at a tip end of said first fuel injection mechanism; and
   a control unit for controlling said high-pressure fuel pump,
   said control unit controlling said high-pressure fuel pump such that the fuel is supplied from said high-pressure fuel pump based on said temperature at the tip end even when the quantity of the fuel injected from said first fuel injection mechanism is decreased, the fuel supplied from the high-pressure fuel pump being delivered through a high-pressure delivery pipe past the first fuel injection mechanism and portions thereof returned through a return pipe to a fuel tank to control the temperature at the tip end of the first fuel injection mechanism to be equal to or less than a predetermined temperature through circulation of the fuel.

17. The fuel supply apparatus for an internal combustion engine according to claim 16, wherein said control unit controls said high-pressure fuel pump based on said temperature at the tip end.

18. The fuel supply apparatus for an internal combustion engine according to claim 17, wherein said control unit controls a quantity of the fuel discharged from said high-pressure fuel pump such that said temperature at the tip end becomes equal to or less than the predetermined temperature.

19. The fuel supply apparatus for an internal combustion engine according to claim 18, wherein said estimating unit estimates said temperature at the tip end based on at least one of a temperature of the internal combustion engine, an engine speed of the internal combustion engine, and a load of the internal combustion engine.

20. The fuel supply apparatus for an internal combustion engine according to claim 16, wherein the estimating unit for estimating a temperature at the tip end of said first fuel injection mechanism is based on a combination of two or more of engine coolant temperature, engine speed, and engine load.

* * * * *